United States Patent
Hrabal

(10) Patent No.: US 10,513,156 B2
(45) Date of Patent: Dec. 24, 2019

(54) TIRE CONDITION OR VEHICLE MONITORING SYSTEM AND METHOD

(71) Applicant: CODA INNOVATIONS, Prague (CZ)

(72) Inventor: Frantisek Hrabal, Prague (CZ)

(73) Assignee: CODA INNOVATIONS (CZ)

( * ) Notice: Subject to any disclaimer, the term of this patent is extended or adjusted under 35 U.S.C. 154(b) by 0 days.

(21) Appl. No.: 15/752,577

(22) PCT Filed: Aug. 5, 2016

(86) PCT No.: PCT/IB2016/001249
§ 371 (c)(1),
(2) Date: Feb. 13, 2018

(87) PCT Pub. No.: WO2017/029554
PCT Pub. Date: Feb. 23, 2017

(65) Prior Publication Data
US 2018/0250991 A1 Sep. 6, 2018

Related U.S. Application Data

(60) Provisional application No. 62/205,659, filed on Aug. 14, 2015.

(51) Int. Cl.
*B60C 23/04* (2006.01)
*B60C 23/12* (2006.01)

(52) U.S. Cl.
CPC .............. *B60C 23/04* (2013.01); *B60C 23/12* (2013.01)

(58) Field of Classification Search
CPC ................................ B60C 23/04; B60C 23/12
USPC .......................................................... 340/442
See application file for complete search history.

(56) References Cited

U.S. PATENT DOCUMENTS

| | | | |
|---|---|---|---|
| 2012/0007729 A1* | 1/2012 | Patel | B60C 23/0471 340/442 |
| 2014/0052332 A1* | 2/2014 | Hernandez Jimenez | B60C 23/02 701/36 |
| 2014/0166118 A1* | 6/2014 | Stephens | B60C 23/12 137/15.01 |
| 2015/0174972 A1* | 6/2015 | Zhou | B60C 23/003 340/447 |
| 2016/0141980 A1* | 5/2016 | Andosca | H02N 2/188 310/319 |

* cited by examiner

*Primary Examiner* — Joseph H Feild
*Assistant Examiner* — Sharmin Akhter
(74) *Attorney, Agent, or Firm* — Steptoe & Johnson LLP

(57) ABSTRACT

All tire systems, including tire systems that include self-inflating devices, need to have the ability to regularly and reliably monitor and report vehicle and tire conditions for safety reasons. For a self-inflating tire, this can be accomplished by monitoring the operation of the self-inflation system, and assessing if it is consistent with a tire in good condition.

18 Claims, 21 Drawing Sheets

6.0a
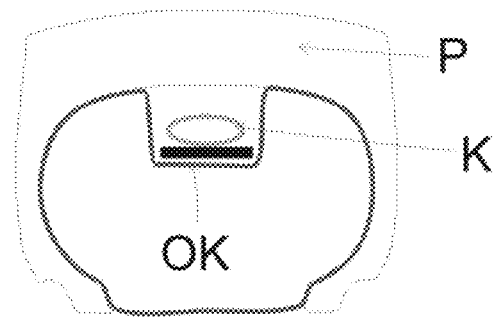
6.0b
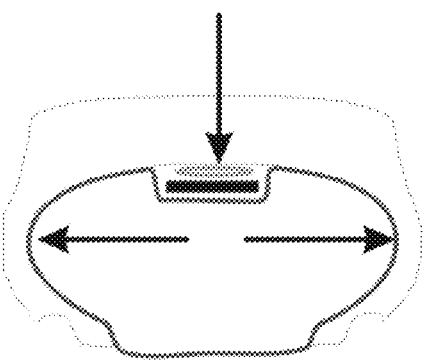
6.1a
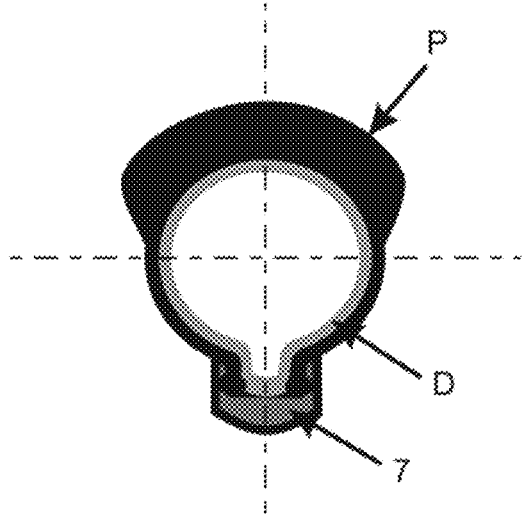
6.1b
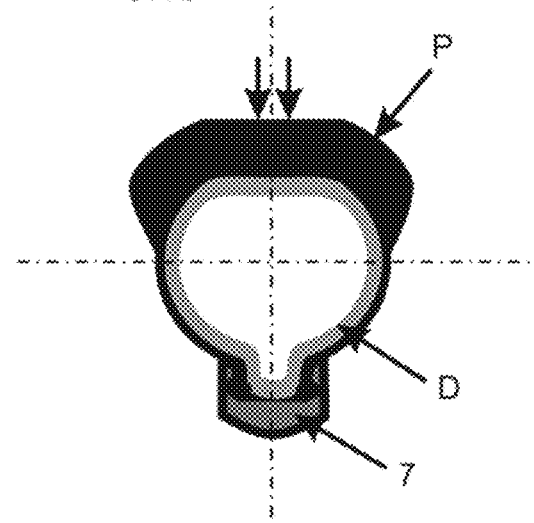
Figure 4B 5.3
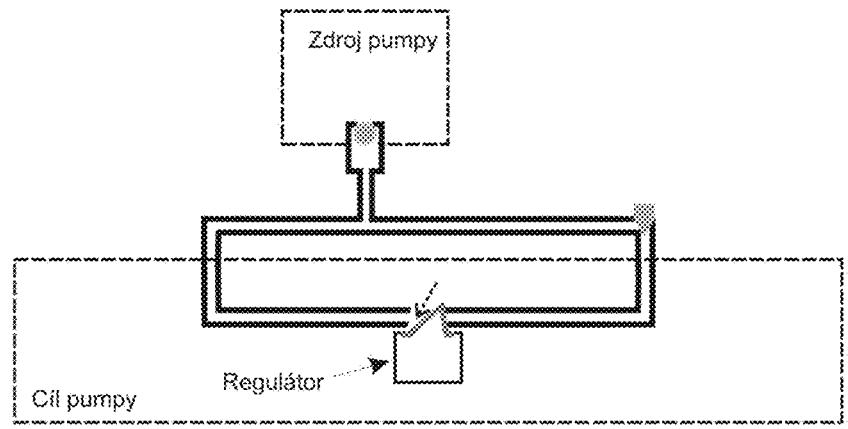
5.4
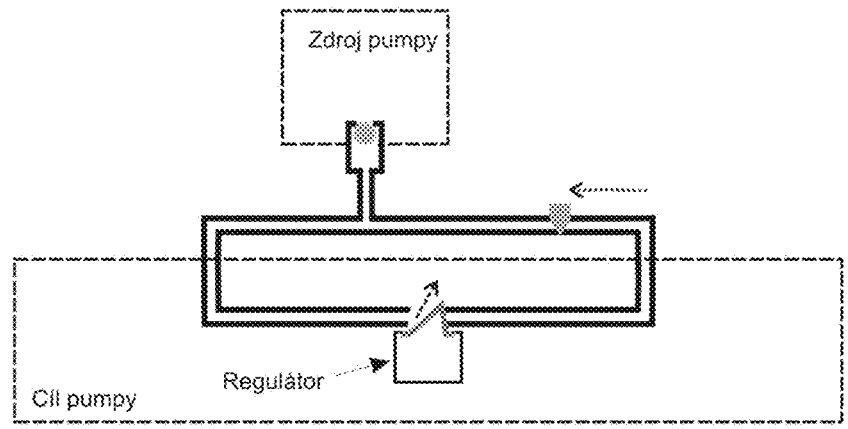
5.5
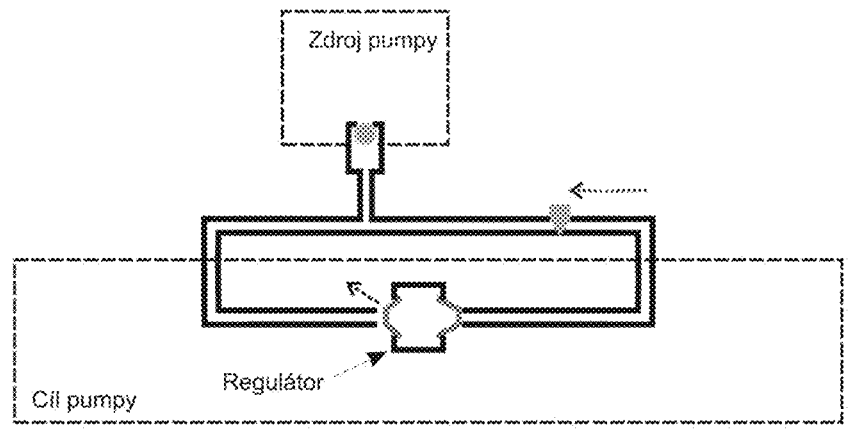
Figure 4D

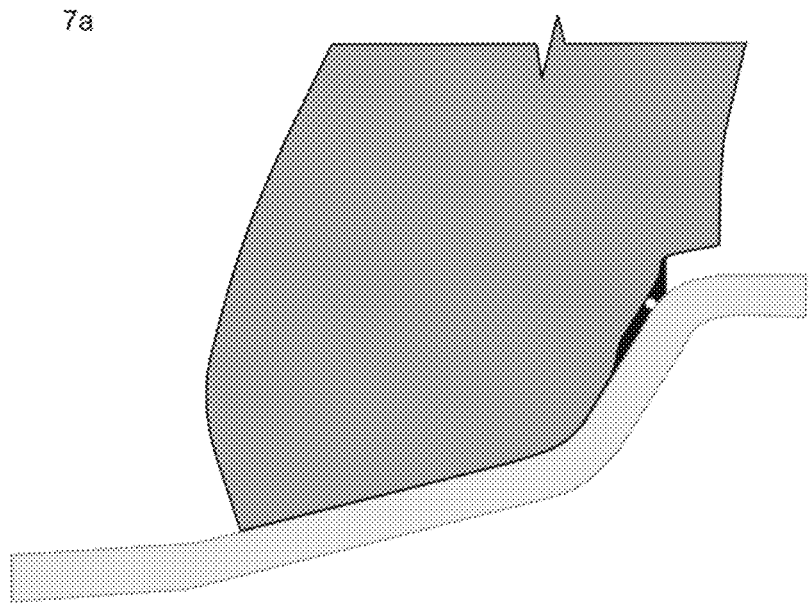
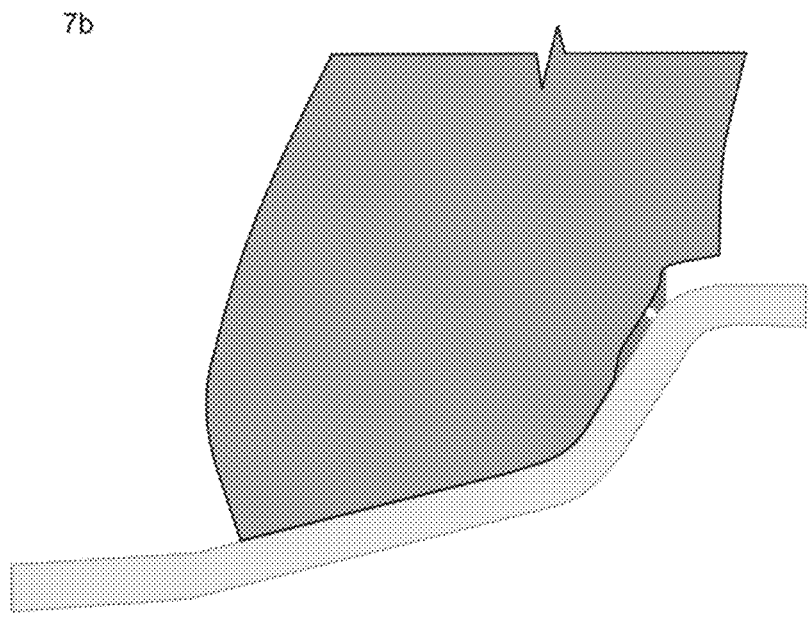
Figure 4F 4.1
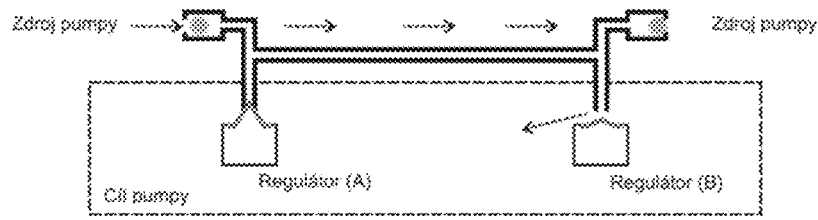
4.2
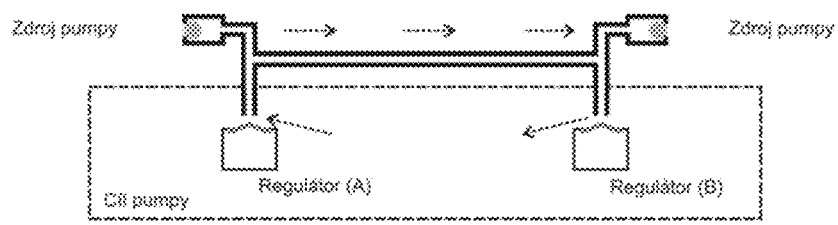
4.3
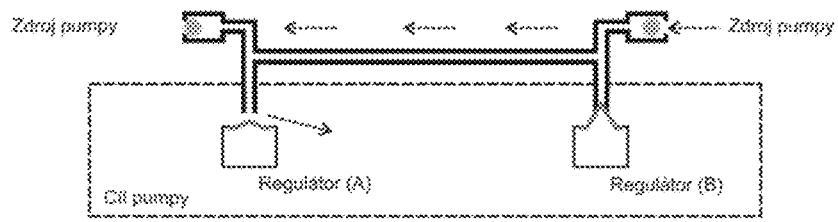
4.4
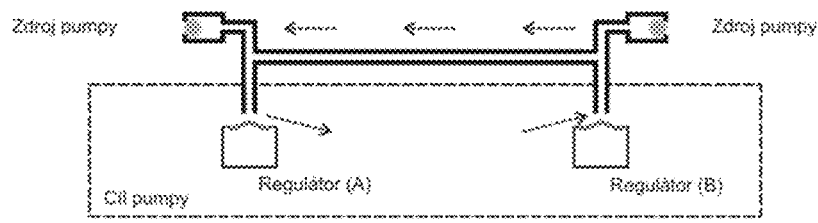
4.5
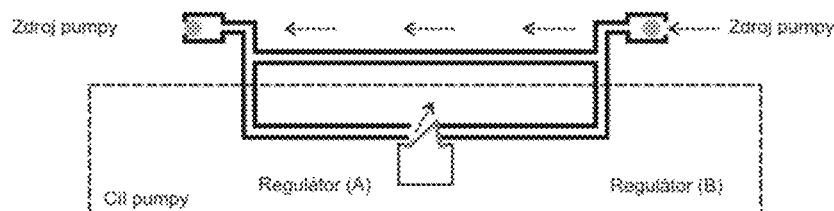
Figure 4I

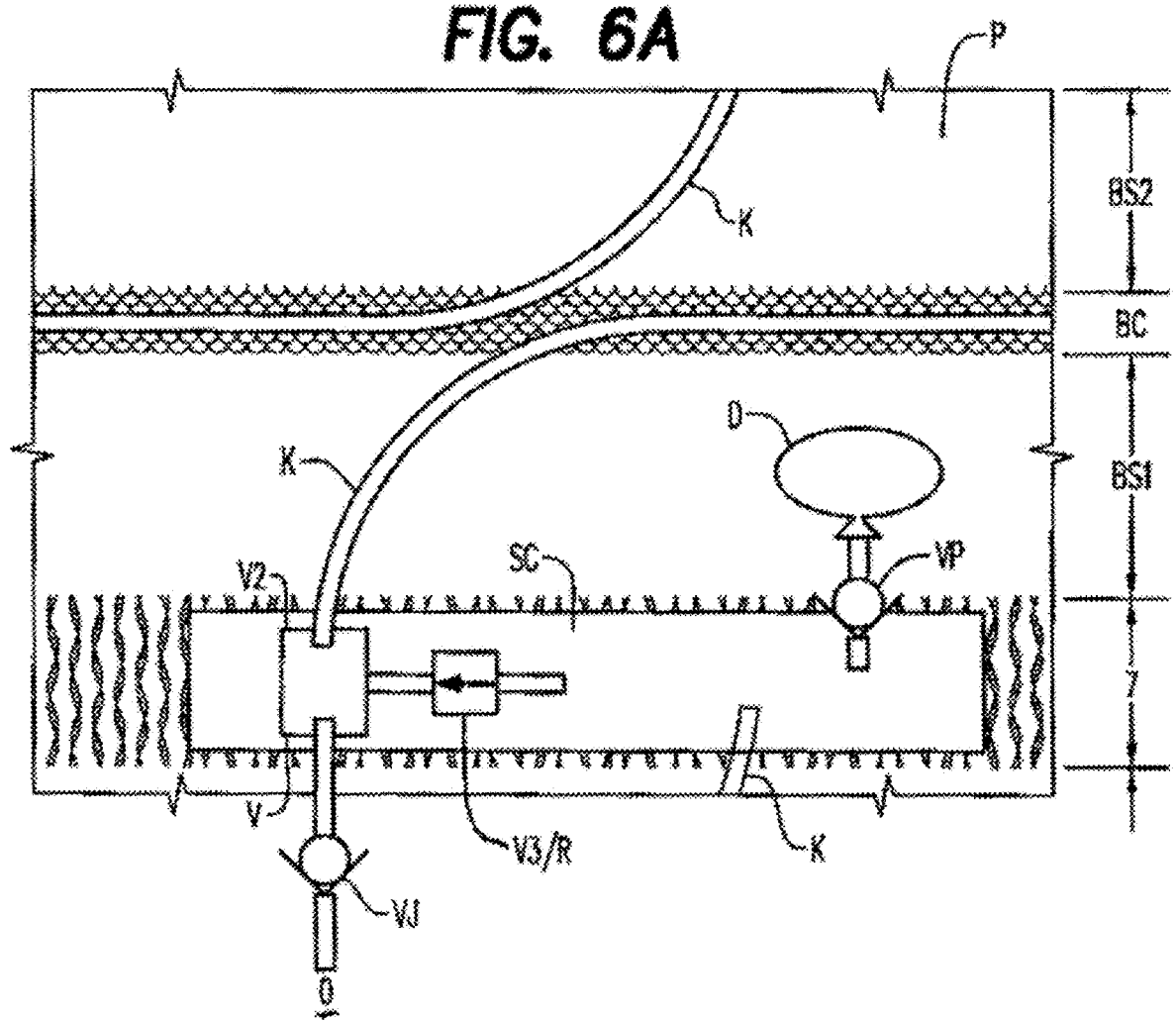
FIG. 6A
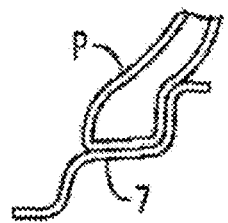 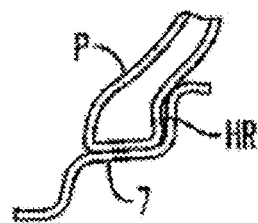 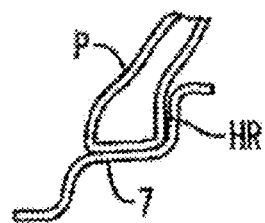
FIG. 7A   FIG. 7B   FIG. 7C

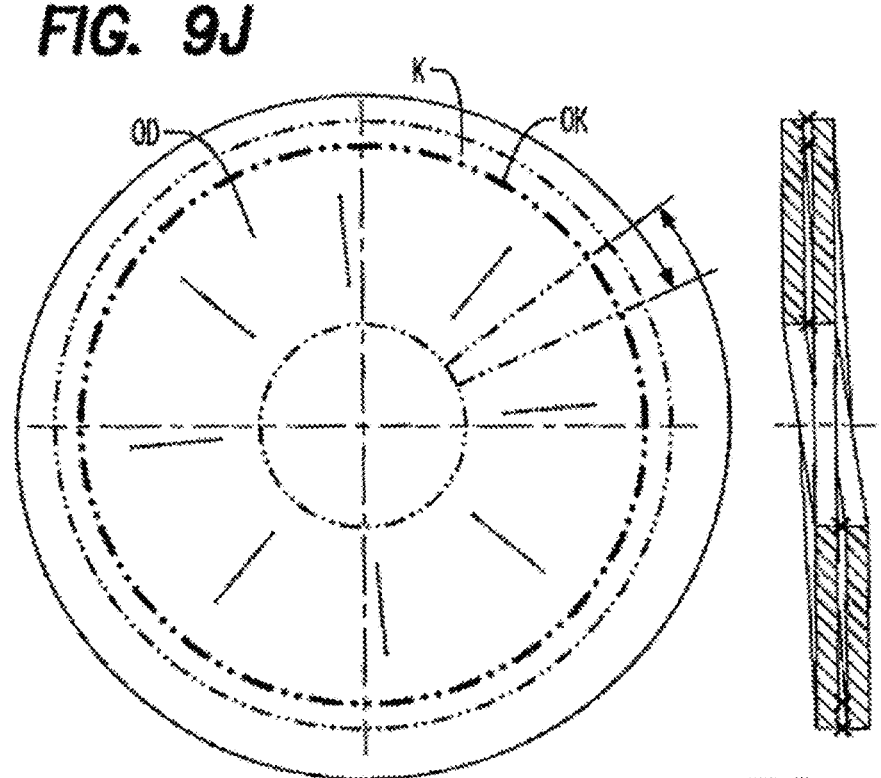
FIG. 9J
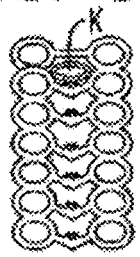
FIG. 9L
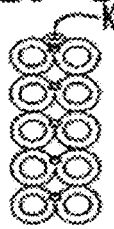
FIG. 9M
FIG. 9K
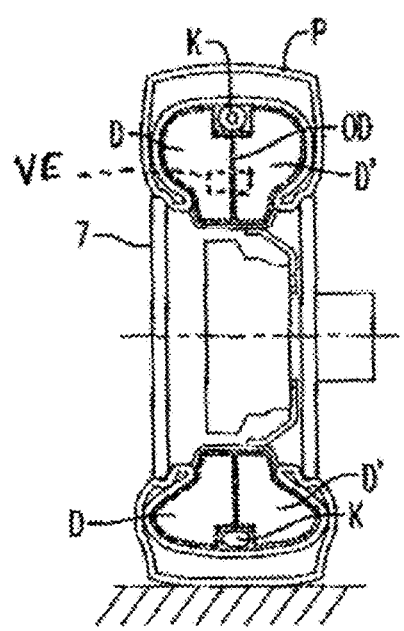
FIG. 10A
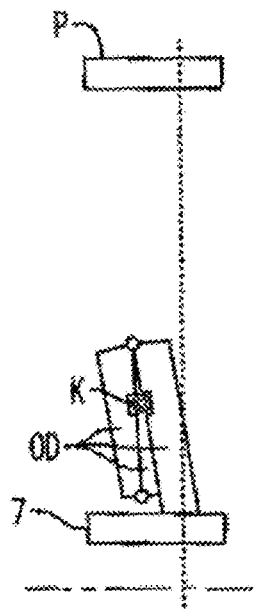
FIG. 10B
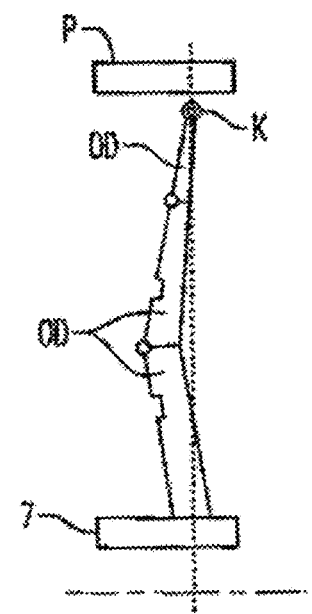
FIG. 10C

TIRE CONDITION OR VEHICLE MONITORING SYSTEM AND METHOD

CLAIM OF PRIORITY

This application claims priority under 35 USC 371 to International Application PCT/IB2016/001249, filed on Aug. 5, 2016, which claims the benefit of prior U.S. Provisional Application No. 62/205,659, filed on Aug. 14, 2015, each of which is incorporated by reference in its entirety.

FIELD OF THE INVENTION

The invention relates to tire condition and vehicle monitoring systems and methods.

BACKGROUND

Self-inflating tires can include a flexible air feed chamber located in the tire wall or next to it. The chamber can be displaced by repeated deformation of the rolling tire, creating a pumping action. In one embodiment, a hose-shaped chamber can be squeezed to a reduced cross-section at the deformation point. Relatively, the deformation point advances along the circumference of the tire as it rolls, pushing the medium contained within the chamber ahead, causing the chamber to work as a peristaltic pump.

SUMMARY

All tire systems, including tire systems that include self-inflating devices, need to have the ability to regularly and reliably monitor and report vehicle and tire conditions for safety reasons. For a self-inflating tire, this can be accomplished by monitoring the operation of the self-inflation system, and assessing if it is consistent with a tire in good condition.

In one aspect, a riding condition monitoring system can include a pump unit driven by tire deformation or rotation of a tire of a vehicle; and a data collector configured to receive data from one or more of the pump unit, a wheel of the vehicle, vehicle, road, driver, operator, a unit outside of vehicle, a pump unit, the tire, a status communication unit and the vehicle; and a processing unit configured to determine a condition status any one of the tire, wheel, vehicle, road, pump unit, driver or operator, from the received data; and a status communication unit configured to provide the condition status to the vehicle, driver, operator, a unit outside of vehicle, a data collector, a pump unit, the wheel or the tire.

In certain embodiments, the received data can include information from one or more of the following parameters: tire deformation; tire footprint size or length or area; tire pressure; tire underinflation; tire overinflation; accumulator pressure; altitude; ambient pressure; geographic coordinates; frequency of inflation cycles of the pump unit; frequency of re-circulation cycles of the pump unit; frequency of opening or closing a regulator of the pump unit; length of time of inflation; distance travelled; tire ambient temperature; vehicle ambient temperature; humidity of air inside of the tire; temperature of ambient air; output (power, voltage, etc) generated by an energy harvester of the pump unit; frequency of activation of an energy harvester of the pump unit; tire deflation speed; tire inflation speed; direction of wheel rotation; speed of wheel rotation; speed of vehicle; time of wheel in a stationary status; and characteristics of tire pressure changes over time.

In other aspects, a method for determining the condition of a self-inflating tire of a vehicle by monitoring a characteristic of its functions can include receiving data from a self inflation device; processing the data to determine the condition of the tire; and delivering the condition of the tire to the vehicle.

In certain circumstances, the method can include determining an actual distance travelled for full inflation of the tire based on pump unit cycles or pump capacity or combinations thereof, and comparing a target distance travelled for full inflation of the tires and designating a good tire condition when the actual distance travelled for full inflation is less than the target distance travelled for full inflation.

In certain circumstances, the method can include determining an actual distance travelled for full inflation of the tire based on input from a tire pressure sensor or pump capacity or combinations thereof, and comparing a target distance travelled for full inflation of the tires and designating a good tire condition when the actual distance travelled for full inflation is less than the target distance travelled for full inflation.

In certain circumstances, the target distance travelled for full inflation can be based on one or more of a target deflation rate for a tire in good condition, the time the tire is stationary, or pump capacity, or combinations thereof.

In certain circumstances, the method can include directly measuring the air volume delivered by the self-inflation system to achieve full inflation and comparing the target air volume for full inflation and designating a good tire condition when the actual air volume to achieve full inflation is less than the target volume.

In another aspect, a vehicle system condition monitoring system can include a pump unit driven by tire deformation or rotation of a tire of a vehicle; and or more from the following a data collector configured to receive data from a data origin; a status communication unit configured to provide condition data or condition status to the data target; or a processing unit configured to determine condition status from the condition data received from the status communication unit.

In certain circumstances, the data origin or data target can include one or more of a status communication unit, a pump unit, a wheel, a valve, a tire, a vehicle, a computer, a chip, or a sensor.

In certain circumstances, the data origin or data target can include one or more of the human, the driver, or the operator.

In certain circumstances, the pump unit can be a peristaltic pump or a diaphragm pump. For example, the pump unit can contain a bypass valve and the pump is configured to recirculate the gas from an origin into a target.

In certain circumstances, the system can include an energy harvester powered by tire deformation, tire rotation or movement of pumped air generates electrical energy.

In certain circumstances, the system can include a battery. For example, the battery can be charged from energy harvester powered by tire deformation, tire rotation or movement of pumped air generates electrical energy.

In certain circumstances, the data origin or data target can be located on/in vehicle.

In certain circumstances, the data origin or data target can be located on/in wheel and/or tire.

In certain circumstances, the data origin or data target can be located outside vehicle.

Other aspects, embodiments, and features will be apparent from the following description, the drawings, and the claims.

BRIEF DESCRIPTION OF THE DRAWINGS

FIGS. 4A-4J feature certain pump configurations.

FIGS. 5A-15C feature other pump configurations.

DETAILED DESCRIPTION

Figure 1:
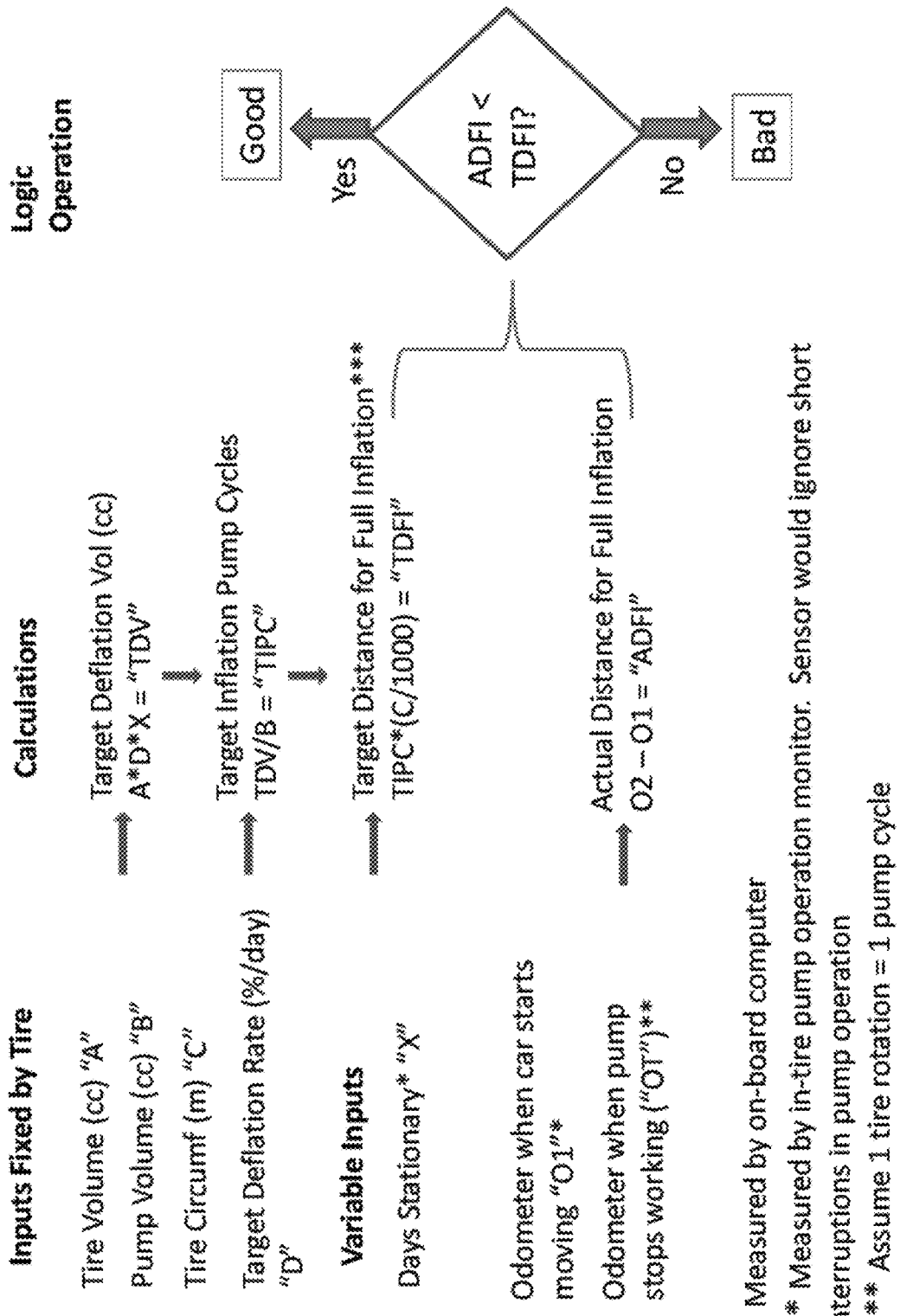
FIG. 1 shows a schematic of a first alternative of a monitoring system.

Conventional tire pressure monitoring systems (TPMS) use various means to warn the driver when tire pressure is low. With a conventional tire, the driver must top up the air manually upon receiving a low-pressure warning. These conventional systems cannot distinguish between low pressure due to routine maintenance requirements and low pressure due to a defect, such as a slow leak around a puncture by an embedded nail.

Relevant tire pressure control systems that can be incorporated into the systems and methods of the invention include those described in, for example, US Patent Publication No. US20140345768, US Patent Publication No. US20120285596, US Patent Publication No. US20100326578, US Patent Publication No. US20120211137, and U.S. Pat. No. 7,117,731, each of which is incorporated by reference in its entirety.

In certain embodiments, a self-inflating tire system enables a tire autonomously to maintain itself at the correct air pressure, using the power of the rolling tire. For a tire in good condition, this eliminates the need for conventional TPMS, because the tire monitors and inflates itself. For a defective tire that is leaking air, self-inflation can, depending on circumstances, maintain air pressure by working harder. However, this ability can conceal a problem and unduly delay its correction.

As described herein, a tire condition monitoring system for self-inflating tires can obtain essential information from monitoring the activity of the self-inflation system and other vehicle conditions. For example, the monitoring system warns the driver if the self-inflation system is working more than would be expected for a tire in good condition. Unlike conventional TPMS, such a system can provide a warning only when there is a tire defect, not when the tire requires routine maintenance inflation. This type of warning can provide valuable information to the driver and solves one potential problem with self-inflating tires, that their self-inflating ability might conceal a problem that requires attention. A simple system can provide a warning only when it detects a problem. A more elaborate system can provide more detailed inflation activity information that can provide other user benefits or safety benefits.

In certain circumstances, the system can be combined with conventional TPMS to monitor the air pressure actually maintained by the self-inflation system. However, in other circumstances, the system can be configured to eliminate the need for conventional TPMS.

Sensors for readout of the pressure are becoming standard equipment of modern cars. Because the capacity of the pump chamber and thus also the capacity of the pump per rotation as well as rotation speed are known, it can be defined after the start of leaking, for example, whether the tire puncture is too large and the chamber K can then compensate it only for a limited period of time. In this case the system can advise the driver to stop on a safe place or inform the driver about the actual driving range. The device can know the driving distance or the vehicle speed. The device can compute the capacity or speed of leakage based on the monitored data. The device can communicate with the driver directly or through a communications interface of the vehicle. If the sensor is placed inside the tire off the backup tube and the pressure drop is slow the system can know the reinflation rate of the tire and can find out how much time the tube can need to take over the sealing function of the tire. Again, if the system determines that the chamber can not compensate the leaking sufficiently it can inform the driver about this in advance. If the tire is punctured along with the base with seams or the backup tube with seams the sensors can detect the drop in tire pressure and then an impactual increase at the moment when the seams rip. The pressure can then start either drop or increase and stop when it can reach the preset pressure. When a pressure drop occurs the system can determine from its rate whether the tube can be reinflated in time or not. The sensor and/or system can be interconnected with a reference space or it can retrieve information about opening of the chamber non-return valve which indicates reinflation or from a different chamber segment from which it gets additional information, for example, that the system has started to reinflate, what is the difference between the pressure of the reservoir space and the tire pressure etc.; thus it can work properly even without information about the wheel revolutions, or it can determine this information by itself. The device can read information about valve status or wheel revolutions from the vehicle.

U.S. application Ser. No. 12/918,690, which is incorporated by reference in its entirety, describes a tire self-inflation system that re-circulates air within a tire when inflation is not required. In one embodiment, the system comprises mainly a peristaltic pump connected to a chamber with 3 apertures, V1, V2 and V3. V1 communicates with the outside atmosphere; V3 communicates with the tire cavity; V2 connects to the intake of the pump, whose outlet is into the tire cavity.

When inflation is not required, V1 is closed and V3 is open; therefore, the pump circulates air from the chamber into the tire cavity, from which it re-enters the chamber through V3 for re-circulation in the next pump cycle. When tire pressure is low, a closure element closes V3; this blocks re-circulation, so that the pump suction draws new air through V1 into the chamber, then through V2 and the pump into the tire cavity, inflating the tire.

For any embodiment, the pump capacity is known. Therefore, the amount of new air pumped into the tire can be determined by monitoring the number of pump inflation cycles. For the arrangement in the example, one tire rotation produces one cycle. Because tire circumference is known, the number of pump cycles can be calculated by measuring the distance travelled over which the closure element is closed.

Alternatively, number of pump cycles can be calculated by measuring time the closure element is closed and the average speed over that time period.

Tires in good condition slowly leak air at various speeds, here at the exemplary rate of about 2% per month. For self-inflation systems powered by the rolling tire, this leakage can reduce tire pressure when the tire is stationary. Therefore, to measure tire condition more precisely, the system further would monitor the period the tire is stationary, calculate the resulting deflation volume consistent with good condition, and compare this with the actual inflation volume delivered by the system after the tire starts rolling and self-inflating.

An in-tire sensor can determine when the closure element is closed so that the system is inflating, or when it is open so that the system is re-circulating, or both. In the system in the example, the flexible membrane that closes V3 can also close an electrical contact to complete a circuit for this purpose. In such a configuration, no other in-tire pressure monitoring sensor is required.

Alternatively, an in-tire pressure sensor could infer when the system is inflating by detecting when the pressure is low, so that self-inflation is required, when the pressure is increasing, indicating that self-inflation is operating, or both. In the basic embodiment, this can be a simple binary sensor that indicates either low pressure or adequate pressure. Alternatively, this can be a more sophisticated sensor that measures actual pressure, pressure changes, rates of pressure change, or some combination thereof or determine pressure from other information, like indirect monitoring systems which do not read pressure directly but determine it from differences in rotation of wheels when i.e. left wheel spins faster then right. Differential spinning can mean the more rapidly spinning tire has a smaller diameter which indicate that left wheel has a lower pressure then right one. Also over-heating of a tire can indicate tire under pressure or other tire defects need to be addressed.

The in-tire information can be sent to an on-board computer, which combines the in-tire information with tire-specific parameters and information on one or more of days stationary, distance travelled, time travelled and average speed, or other parameters, depending on the chosen configuration, to compute actual self-inflation volume and expected self-inflation volume consistent with good tire condition. In a basic embodiment, the system delivers a warning to the operator if actual inflation exceeds expected inflation. Alternatively, additional inflation data can be reported.

If the air volume of each pump volume is highly variable over a reasonably expected range of tire pressures, the system may require actual tire pressures over the course of the inflation phase in order more accurately to calculate the self-inflation volume. In this case, in-tire sensors that measure actual tire pressure would be required. Whether this requirement exists depends on the characteristics of the self-inflation system.

A self-inflating tire system can use or be managed with the help of any information or determined information from the system, using information from the vehicle, the tire, the environment, or combinations thereof. The information can be gathered using the self-inflating tire device independently or in combination with other vehicle data sources, including, but not limited to, a car on-board computer, an on-board GPS, a thermometer, a wireless transmission or radio signal. Each of these can be used to generate information that can help manage a tire pressure monitoring system.

The received data can include information from one or more of the following parameters: tire deformation; tire footprint size or length or area; tire pressure; tire underinflation; tire overinflation; accumulator pressure; altitude; ambient pressure; geographic coordinates; frequency of inflation cycles of the pump unit; frequency of re-circulation cycles of the pump unit; frequency of opening or closing a regulator of the pump unit; length of time of inflation; distance travelled, including distance travelled with the self-inflation system in various states; tire ambient temperature; vehicle ambient temperature; humidity of air inside of the tire; temperature of ambient air; output (power, voltage, etc) generated by an energy harvester of the pump unit; frequency of activation of an energy harvester of the pump unit; tire deflation speed; tire inflation speed; direction of wheel rotation; speed of wheel rotation; speed of vehicle; time of wheel in a stationary status; and characteristics of tire pressure changes over time, and human input. For example, characteristics of the tire pressure changes can include the behavior of the tire pressure changes, for example, when tire pressure is low during night when temperature is low and then it increase during day when temperature goes up, then the pressure characteristics correspond to temperature characteristics.

The key function of the tire is to secure as ideal tire footprint as possible. Proper footprint decreases consumption, rolling resistance and braking distance. Inflation, load and speed all affect tire footprint. Also, driving conditions has effect. Monitoring of the footprint can provide information about how to adjust tire inflation or how to tune vehicle systems. For example, during harsh ride, the on-board computer of the vehicle can adjust suspension to take some load from the tires. Because tire footprint reflects of various conditions of the tire, the following information can contribute to a full picture about footprint status: tire deformation and tire footprint size, length of footprint or area of footprint; tire pressure; tire underinflation; tire overinflation; accumulator pressure; altitude; ambient pressure; geographic coordinates; frequency of inflation cycles of the pump unit; frequency of re-circulation cycles of the pump unit; frequency of opening or closing a regulator of the pump unit; length of time of inflation; distance travelled; tire ambient temperature; vehicle ambient temperature; humidity of air inside of the tire; temperature of ambient air; output (power, voltage, etc) generated by an energy harvester of the pump unit; frequency of activation of an energy harvester of the pump unit; tire deflation speed; tire inflation speed; direction of wheel rotation; speed of wheel rotation; speed of vehicle; time of wheel in a stationary status; and characteristics of tire pressure changes over time.

For example, if there is an accumulator that stores excess air from the tire, knowledge of the pressure inside the accumulator can convey information about whether system works properly, which can be processed by computer. Also, it may determine how long the vehicle can be driven if a leak is compensated from the reservoir.

Altitude and pressure influence each other: at higher altitude are lower pressures, which influence tire pressure itself, but also speed of inflation, because lower input pressure can mean slower inflation. We may read the information about altitude from altimeter or from GPS and map, so when car computer knows its location, it also knows the altitude. Similarly, ambient and internal tire temperature complements the information about tire or vehicle status.

GPS with navigation can also assist tire pressure management. If a route is input into GPS, future conditions can be anticipated and pressure adjusted accordingly. The adjustment can take into account the time required to make a pressure change. The computer can send instruction to wheel-located switch, which triggers inflation. Alternatively, the device can decide if the accumulator contains sufficient air, and, if not, then pump the tire or accumulator from ambient air to create sufficient buffer. The computer can be on-board, an in-tire chip, or a combination.

Information about valve opening can provide important information about the status of the system and pump operation. Also, the inflation rate can indicate whether there is a leak, if so, whether the system can compensate for it and warn the driver of the leak and the time or distance before full deflation. The length of the time of inflation or distance travelled while inflating, plus information about decrease of pressure or increase of pressure during that time, complements that decision.

When air is inflated from outside of tire, it can carry humidity. Humidity can influence how temperature affects the pressure inside the tire, and information about its status is important to complement full picture about tire or vehicle status.

Useful air-flow information, including inflation rates, can be measured directly by a flow meter in the pump system. A flow meter that employs an impeller or similar structure driven by air-flow also can be used to drive an electrical generator. Electricity so generated can power the tire condition monitoring system or other in-tire or on-wheel applications that require electricity, or to charge a battery that powers such systems.

Also, inputs from the driver can contribute to the complete picture of vehicle or tire condition. If the driver prefers a faster ride, he can select that configuration at the driver's position or an on-board computer can autonomously recognize driver style and adjust vehicle systems to make ride smooth, economical, safe, etc. The information, or result of computing of such information, can be also provided back to wheel for proper tire condition maintenance, and to other vehicle systems for them to be adjusted to improve vehicle performance. Also, if driver style is recognized as dangerous, vehicle systems, including tire pressure, can adjust themselves to decrease the danger. Fleet operator may preset desired economical parameters into on-board computer for whole fleet. These examples show only part of possible options in which any information of above-listed types contributes to condition monitoring, and that the information can originate in tire, wheel, vehicle, or even outside of vehicle, in database, from driver or operator.

So the monitoring system can not only collect and store information but also feed the information or result of computing of such information to any other vehicle systems, including wheel or pump mechanism itself, on-board computer, human driver or operator etc.

An effective method to monitor the condition of a tire can include measuring the actual deflation rate and compare it to the target deflation rate. The information necessary to determine the actual deflation rate includes the air volume required to re-inflate the tire. This re-inflation volume can be measured directly, with a flow meter, or inferred from the operation of the system. For self-inflation systems of the type described, inferring inflation volume from system operation is most simply done by measuring the distance travelled over which the system is in inflation mode. From this information, the number of active pump cycles can be inferred, and, combined with the known pump volume, an inflation volume calculated.

Whether the system is in inflation mode can be determining by observing the system configuration, or inferred from measuring pressure, or pressure changes, in the tire or another part of the system.

Alternatively, active pump cycles can be counted directly with a sensor in the system, or inferred from time required for full inflation combined with average speed over that time, from which active pump cycles can be inferred.

The simplest measurements can be based on distance. Time is function of distance and average speed, so measuring time involves another variable, which is unnecessary. Pump cycles are a function of distance (one tire rotation is one pump cycle), so counting pump cycles directly is unnecessary. However, to infer pump cycles, an in-tire sensor is required to monitor when pump is working, rather than re-circulating. Reliable sensor will ignore short interruptions in pumping. Alternatively, monitor when pump is not working (not-working is complement of working; system will be in one of these two states all the time when tire is rolling). The following calculations assume that air volume delivered by each by pump cycle (rotation) is independent of tire pressure. Accordingly, Alternative 2 employs simple binary TPMS, with two states: properly inflated and under-inflated. If pump volume materially changes with tire pressure, accurate calculations require in-tire sensor to measure actual tire pressure for both Alternatives. Additional calculation can be required in on-board computer.

In further detail, the pump of the self-inflation system works only, but not always, when the tire is rolling. In the system of the example, when the tire is rolling, the pump can either be working to inflate the tire (not in recirculation mode), or not working (in recirculation mode). The distance can then be measured while the pump is working ("Alternative 1"). See FIG. 1. For reliable measurements, the in-tire sensor should ignore brief interruptions while monitor either working or recirculation mode. Alternatively, a system can monitor the condition of the tire by measuring the distance to reach the correct pressure by monitoring a direct binary TPMS with two states: properly inflated and under-inflated. ("Alternative 2"). See FIG. 2.

Alternative 1 and Alternative 2 both involve calculations that assume the air volume delivered by each pump cycle (one tire rotation for the system in the example), is independent of tire pressure. If pump volume does materially change with tire pressure, accurate calculations require the in-tire sensor to measure the actual tire pressure. These measurements would involve the additional calculation done by an on-board computer or chip within the wheel. The more challenging component is that the system would require a complex sensor.

The system infers deflation volume from the air volume required to re-inflate the tire to correct pressure. To assess the tire condition requires assessing the deflation rate. This can be calculated adequately by dividing the re-inflation volume by the time the tire has been stationary, during which the system cannot operate.

Now, the foregoing can be described with variables and calculations. Example units (cc, m, days) are specified for illustrative purposes: Alternative 1 involves measuring the distance the pump is working. When the actual distance traveled for full inflation ("ADFI") is less than the target distance for full inflation ("TDFI"), the tire is in good condition (ADFI<TDFI). The calculations needed to determine this comparison involve inputs fixed by the tire and variable inputs. Inputs fixed by the tire include: tire volume (cc) ("A"), pump volume (cc) ("B"), tire circumference (m) ("C"), and target deflation rate (%/day) ("D"). The variable inputs include: days stationary as measured by an on-board computer ("X"), the initial odometer reading when the car starts moving, also measured by an on-board computer ("O1"), and the odometer reading when the pump stops working, as measured by the in-tire pump operation monitor ("O2"). (The ppt slide has this written as OT and then O2)

The ADFI is the mileage reading on the odometer when the pump stops working less the odometer reading when the car starts moving (O2−O1).

Determining the TDFI requires first determining 1) the target deflation volume (cc) ("TDV") and 2) the target inflation pump cycles ("TIPC"). The TDV is equal to the tire volume multiplied by the target deflation rate, multiplied by the days stationary (A*D*X). The TIPC is then determined using the TDV divided by the pump volume (TDV/B).

Lastly, the TDFI is equal to the target inflation pump cycles multiplied by the tire circumference and divided by one thousand (TIPC*(C/1000)). The tire is in good shape if ADFI is less than TDFI.

Alternative 2 involves measuring the distance to reach the correct pressure by monitoring a direct TPMS. Alternative 2 varies from Alternative 1 in the second odometer measurement (O2). While Alternative 1 utilizes the odometer measurement when the pump stops working and is measured by an in-tire pump operation monitor, Alternative 2 measures the final odometer value when the TPMS shows full inflation and is measured by an in-tire direct TPMS.

When the actual distance traveled for full inflation ("ADFI") is less than the target distance for full inflation ("TDFI"), the tire is in good condition (ADFI<TDFI). The calculations needed to determine this comparison involves inputs fixed by the tire and variable inputs. Inputs fixed by the tire include: tire volume (cc) ("A"), pump volume (cc) ("B"), tire circumference (m) ("C"), and target deflation rate (%/day) ("D"). The variable inputs include: days stationary as measured by an on-board computer ("X"), the initial odometer reading when the car starts moving, also measured by an on-board computer ("O1"), and the odometer reading when the TPMS shows full inflation as measured by the in-tire direct TPMS ("O2").

The ADFI is the mileage reading on the odometer when the pump stops working less the odometer reading when the car starts moving (O2−O1).

Determining the TDFI requires first determining 1) the target deflation volume (cc) ("TDV") and 2) the target inflation pump cycles ("TIPC"). The TDV is equal to the tire volume multiplied by the target deflation rate multiplied by the days stationary (A*D*X). The TIPC is then determined using the TDV divided by the pump volume (TDV/B). Lastly, the TDFI is equal to the target inflation pump cycles multiplied by the tire circumference and divided by one thousand (TIPC*(C/1000)). The tire is in good shape if ADFI is less than TDFI.

An origin can be a source of air. A target is where air gets to from pump. For example, during inflation origin can be outside environment and target can be tire or reservoir. When inflation is not needed and system recirculates, origin and target can be the same, so the pump takes air from one location and returns it to the same location.

As described above, the foregoing calculations could be substituted with other variables, including active pump cycles directly measured, or time to full inflation and average speed during that time. If required for accurate measurement, due to large variability in air volume per pump cycle depending on tire pressure over the expected range of operation, actual air pressure can be measured and the calculation adjusted accordingly. Alternatively, the air volume for full inflation could be measured directly with a flow-meter.

The data can be transmitted and processed using standard protocols, which can be tailored or modified to work with the specific conditions of the system. Referring to the system described herein, the system in FIG. 3, includes a centralized computer 110, a pump unit 106, a data collector 102, a processing unit 104 and a status communication unit 105. The units can interconnect in a wide variety of ways. The system can optionally include a display or other warning capability. The status communication unit is a transmitter or other provider of status or condition information. The system can include a general-purpose computer and can have an internal or external memory for storing data and programs such as an operating system (e.g., DOS, Windows 2000™, Windows XP™, Windows NT™, OS/2, UNIX, iOS, Android or Linux) and one or more application programs. Examples of application programs include computer programs implementing the techniques described herein for lyric and multimedia customization, authoring applications (e.g., word processing programs, database programs, spreadsheet programs, or graphics programs) capable of generating documents or other electronic content; client applications (e.g., an Internet Service Provider (ISP) client, an e-mail client, or an instant messaging (IM) client) capable of communicating with other computer users, accessing various computer resources, and viewing, creating, or otherwise manipulating electronic content; and browser applications (e.g., Microsoft's Internet Explorer) capable of rendering standard Internet content and other content formatted according to standard protocols such as the Hypertext Transfer Protocol (HTTP). One or more of the application programs can be installed on the internal or external storage of the general-purpose computer. Alternatively, in another embodiment, application programs can be externally stored in or performed by one or more device(s) external to the general-purpose computer. In an embodiment, the processing unit and the communication unit may be an application program.

In addition, the data collector, the processing unit and the communication unit may be or can include a computer, a server, a laptop computer or other mobile computing device, a network-enabled cellular telephone (with or without media capturing/playback capabilities), wireless client, or other client, machine or device to perform various tasks including Web browsing, search, and other tasks, applications and functions. System may additionally include any portable media device such as digital still camera devices, digital video cameras (with or without still image capture functionality), media players such as personal music players and personal video players, and any other portable media device.

The general-purpose computer may include a central processing unit (CPU) for executing instructions in response to commands, and a communication device for sending and receiving data. One example of the communication device is a modem. Other examples include a transceiver, a communication card, a satellite dish, an antenna, a network adapter, or some other mechanism capable of transmitting and receiving data over a communications link through a wired or wireless data pathway.

The general-purpose computer may also include an input/output interface that enables wired or wireless connection to various peripheral devices. Examples of peripheral devices include, but are not limited to, a mouse, a mobile phone, a personal digital assistant (PDA), a keyboard, a display monitor with or without a touch screen input, and an audiovisual input device. In another implementation, the peripheral devices may themselves include the functionality of the general-purpose computer. For example, the mobile phone or the PDA may include computing and networking capabilities and function as a general purpose computer by accessing a network and communicating with other computer systems. Examples of a network, such as network 108, include the Internet, the World Wide Web, WANs, LANs, analog or digital wired and wireless telephone networks (e.g., Public Switched Telephone Network (PSTN), Integrated Services Digital Network (ISDN), and Digital Subscriber Line (xDSL)), radio, television, cable, or satellite systems, and other delivery mechanisms for carrying data. A communications link can include communication pathways that enable communications through one or more networks.

In one implementation, a processor-based system of the general-purpose computer can include a main memory, preferably random access memory (RAM), and can also include a secondary memory. The secondary memory can include, for example, a hard disk drive or a removable storage drive, representing a floppy disk drive, a magnetic tape drive, an optical disk drive (Blu-Ray, DVD, CD drive), magnetic tape, paper tape, punched cards, standalone RAM disks, Iomega Zip drive, etc. The removable storage drive can read from or write to a removable storage medium. A removable storage medium can include a floppy disk, magnetic tape, optical disk (Blu-Ray disc, DVD, CD) a memory card (CompactFlash card, Secure Digital card, Memory Stick), paper data storage (punched card, punched tape), etc., which can be removed from the storage drive used to perform read and write operations. As will be appreciated, the removable storage medium can include computer software or data.

In alternative embodiments, the secondary memory can include other similar means for allowing computer programs or other instructions to be loaded into a computer system. Such means can include, for example, a removable storage unit and an interface. Examples of such can include a program cartridge and cartridge interface (such as the found in video game devices), a removable memory chip (such as an EPROM or PROM) and associated socket, and other removable storage units and interfaces, which allow software and data to be transferred from the removable storage unit to the computer system.

Examples of communications interfaces can include a modem, a network interface (such as, for example, an Ethernet card), a Bluetooth connection, a wireless communication connection, a communications port, a memory card slot and a PCMCIA slot and card. Software and data transferred via a communications interface may be in the form of signals, which can be electronic, electromagnetic, optical or other signals capable of being received by a communications interface. These signals may be provided to a communications interface via a channel capable of carrying signals and can be implemented using a wireless medium, wire or cable, fiber optics or other communications medium. Some examples of a channel can include a phone line, a cellular phone link, an RF link, a network interface, and other suitable communications channels.

In this document, the terms "computer program medium" and "computer readable medium" are generally used to refer to media such as a removable storage device, a disk capable of installation in a disk drive, and signals on a channel. These computer program products may provide software or program instructions to a computer system.

Computer-readable media include both volatile and nonvolatile media, removable and non-removable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, DVD, holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Computer programs which may be associated with applications may be stored in the main memory or secondary memory. Such computer programs can also be received via a communications interface. Such computer programs, when executed, may enable the computer system to perform the features as discussed herein. In particular, the computer programs, when executed, may enable the processor to perform the described techniques. Accordingly, such computer programs may represent controllers of the computer system.

In an embodiment where the elements are implemented using software, the software can be stored in, or transmitted via, a computer program product and loaded into a computer system using, for example, a removable storage drive, hard drive or communications interface. The control logic (software), when executed by the processor, may cause the processor to perform the functions of the techniques described herein.

In another embodiment, the elements may be implemented primarily in hardware using, for example, hardware components such as PAL (Programmable Array Logic) devices, application specific integrated circuits (ASICs), or other suitable hardware components. Implementation of a hardware state machine so as to perform the functions described herein will be apparent to a person skilled in the relevant art(s). In yet another embodiment, elements may be implanted using a combination of both hardware and software.

In another embodiment, the computer-based methods can be accessed or implemented over the World Wide Web by providing access via a Web Page to the methods described herein. Accordingly, the Web Page may be identified by a Universal Resource Locator (URL). The URL may denote both a server and a particular file or page on the server. In this embodiment, it is envisioned that a client computer system may interact with other components of the system by URL, which in turn may cause the browser to send a request for that URL or page to the server identified in the URL. Typically, the server may respond to the request by retrieving the requested page and transmitting the data for that page back to the requesting client computer system, which may be the client device 106 (the client/server interaction may be typically performed in accordance with the hypertext transport protocol or HTTP). The selected page may then be displayed to the user on the client's display screen. The client can then cause the server containing a computer program to launch an application, for example, to perform an analysis according to the described techniques. In another implementation, the server can download an application to be run on the client to perform an analysis according to the described techniques.

In embodiments, the pump can be a perstaltic pump or a diaphragm based pump.

Such a device for transport of air in the tire, or close to it, can include a chamber in form of a hollow compressible channel, placed along at least a part of the tire perimeter. For example, a ring is attached to the inner side of the chamber with the distance of its outer side from the tire rotation axis equals 1 to 1.1 multiple of the distance of the chamber bottom side from the tire rotation axis. Another type is the device for transport of air in the tire or close to it with the channel fitted with a valve on at least one of its inputs. The channel can be interconnected with the tire tube and/or backup air tire tube and/or case and/or base by at least one of its ends.

Another type is the device for transport of air in the tire, or close to it, fitted with a control element interconnected with a sensor located in a completely separated space formed by a sealed bag, which is, from outside, at least partly under pressure of air in the tire and/or case and/or base. The space for the chamber can be made by inserting a cradle between the tire and rim.

Yet another type is the device for compression of the air in the tire or close to it with the chamber and/or any pump inserted between two coupled wheels.

The chamber and/or any pump in the tire can be placed on a base. Effectively, the base comprises a hollow disc. Effectively, the base has its opposing walls joined, which defines its cross-section. The base can be a rigid and/or collapsible system and/or spring and/or spring material. The base completely or almost completely prevents the air exchange between the two parts of the tire pressure space separated by it. Effectively, the base is fitted with at least one valve and/or vent interconnecting the base of the separated part of the tire pressure space.

Another subject of the invention is a device for transport of air in the tire, or close to it, with a chamber with shape memory placed in the tire wall, or close to it, and a power generator placed within or at an end of the chamber.

Effectively, the ring is placed on the air tube and/or bag placed inside the tire and filled by air. Effectively, the chamber end is interconnected with the air tube and/or bag and/or base and/or case. The chamber end can be fitted with a control element.

Effectively, the valve is a three-way valve with its ends interconnected with the external environment and the internal space of the tire, where one end is provided with a valve, the next end is connected to the chamber with shape memory, and the last end is interconnected with the closure element. Effectively, the channel is, at least in its part, formed by a lengthwise segmented chamber provided with 4 openings, where the longitudinal divisional plane is movable in the direction of deformation of at least one of the segmented parts of the chamber and at least one opening is provided with a valve and/or at least one segmented part of the chamber is permanently blocked by the deformation. The lengthwise segmented chamber can be placed in the wall and/or close to the wall of the tire and/or air tube and is provided with 3 openings into the tire and one opening into the external environment or with 3 openings into the external environment and one opening into the tire and/or the end of one longitudinal part of the chamber is interconnected with the end of the second longitudinal part of the chamber. The channel and/or chamber can be made by at least one of two flexible tubes placed next to each other, where one has the outer diameter equal to the inner diameter of the other tube and/or one is, at least partly, inserted inside the other. The pump can have any other configuration suitable for self-inflation, for example, the devices described in PCT/IB2015/54600 filed Jun. 18, 2015, or U.S. Patent Publication 2014/0020805, each of which is incorporated by reference in its entirety.

Effectively, the chamber is in form of a curved hollow channel with at least one its outer wall at least partly formed by at least a part of two areas lying in the longitudinal direction of the chamber, containing the angle a=0 to 120, while it is true that if a>0 it is located on the contact edge of these areas situated on the farther side from the center of the area of the chamber cross-section.

The ring can be of a variable length. Effectively, the ring has a T-, I-, or O-shaped section or alike. A ring or pressure transmitter acts on the chamber wall with less area than the area from which the tire pressure acts on it from the opposite side. A tire and/or rim and/or air tube and/or base and/or chamber containing adhesive and/or sectional lock can interconnect with any element from the group of tire and/or rim and/or air tube and/or base and/or chamber. A tire and/or rim can be adapted for placing of any device. A tire can be interconnected with a coil and/or magnet.

For example, the chamber 1 for adjustment of pressure in the tire P is created inside the tire P alongside at its tread part in the space defined by the wall of the tire P from the top and by at least a part of the ring OK from the bottom with its length defined in such a way that an unloaded part of the ring OK is away from the wall of the tire P. It means if the wall of the tire P lies, for example, on the radius of 50 cm and the ring OK on the radius of 49 cm there can be a 1 cm high space between them. Such a space between the ring OK and the wall of the tire P can be thereinafter called PO. A chamber K can be placed within this space PO. A loaded tire P bears against the chamber K in the point of load deformation and closes it crosswise under the condition that the deformation of the tire P overcomes the whole cross-section of the chamber K. This allows the right function of the chamber K for the inflation of the tire P; the place of closure moves along the chamber K and pumps the air towards the inside of the tire P thus reinflating it. The chamber K can fill up the entire aforementioned 1 cm space, or it can be smaller and adjoin the ring OK, wall of the tire P, or lie in between them, alternatively it can be an integral part of the tire P, ring OK, or both. If the chamber K does not fill up the entire cross-section of the aforesaid space PO the remaining volume of this space PO may be effectively separated from the tire pressure space. Alternatively, this space is vented outside the tire. P or it can be interconnected with the inlet of the chamber K and the air is exhausted from it at the beginning and pumped into the tire P. If the deformation in this example becomes bigger than 1 cm the ring OK likewise the air tube D of the tire P can evade this deformation towards the inside of the tire P.

Figure 5A:
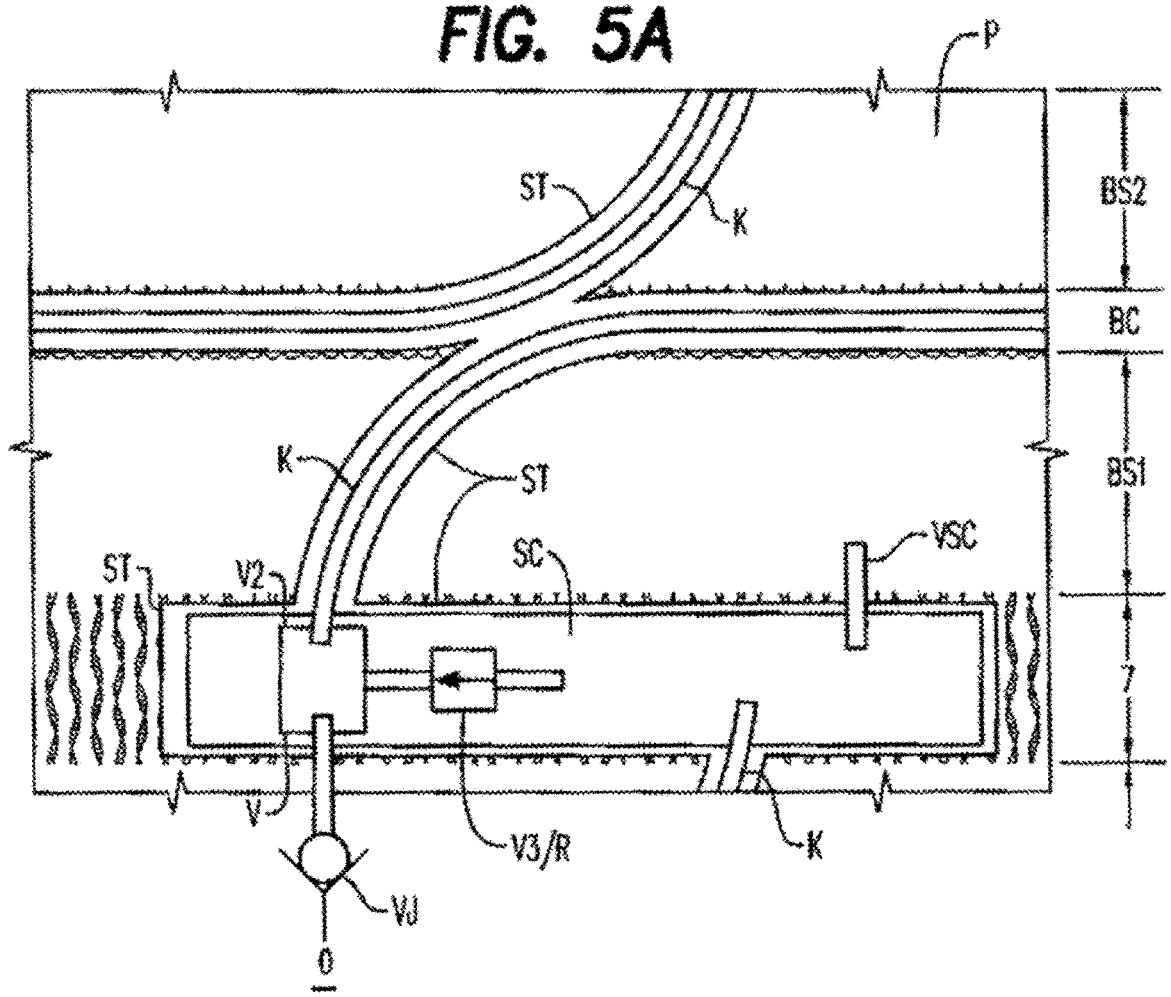
Figure 5B:
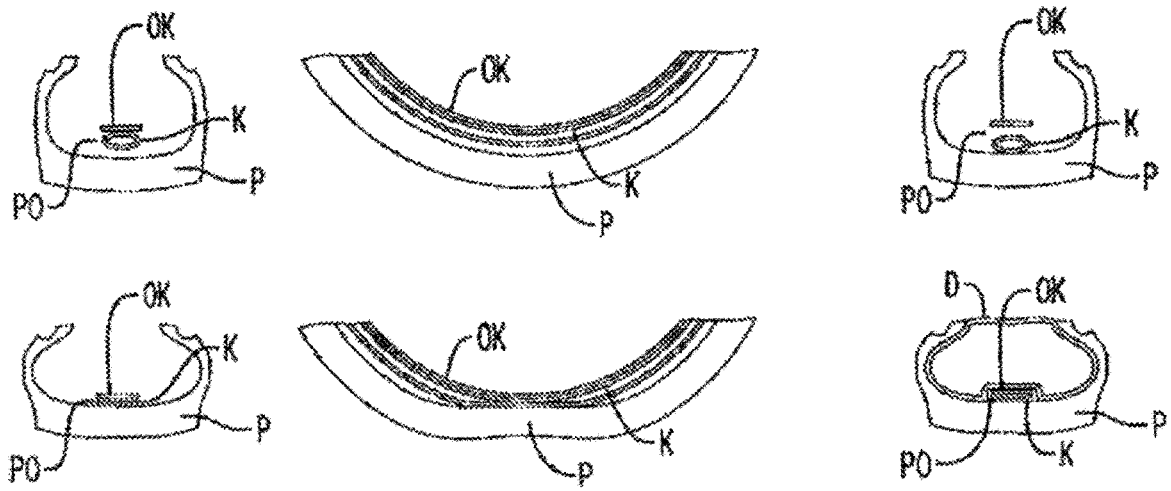

FIG. 5B shows a section through a non-deformed tire P, ring OK placed near the inner tread part of the tire P and chamber K placed between the ring OK and the wall of the tire P. FIG. 5B shows the tire P deformed and chamber K closed crosswise. While the chamber K on FIG. 5B is placed within the space PO and at its side at the ring OK, the chamber K on FIG. 5B is placed within the space PO on the opposite side, at the tire wall. The FIG. 5B shows a similar situation as FIG. 5B but with the air tube D added.

In another example, because the ring OK could move freely inside the tire P, thus disabling proper functioning, it needs to be fixed on the right place. One option is to place the ring OK onto the air tube of the tire P. The inflated air tube D adjoins the walls of the tire P; only in point of mounting of the ring OK the air tube D does not adjoin the wall of the tire P but the wall of the ring OK thus holding it in place. Because the main task of the ring OK in this case is to define the maximum diameter of the air tube D in point of the ring OK and set the space PO for the chamber K or the space of the chamber K itself the ring OK can be made of e.g. textile, only it must have clearly defined maximum circumference of the ring OK which can ensure its sufficient distance from the wall of the tire P, at least in a part of its perimeter. This has already been shown and described in FIG. 5B depicting a section through a loaded tire P, ring OK, and air tube in point of placement of the ring OK and in FIG. depicting the same situation only in cross-section. Likewise, the FIG. 4G, panel 2.1 5B shows a cross-section of the situation from the FIG. 5B in point of the load where the chamber K is closed crosswise by the load deformation section of which can be seen in FIG. 5B.

To enable reinflation on at least same or slightly higher pressure than the pressure in the tire P must be reached inside the chamber K between the place of its deformation and the output from the chamber K into the tire P and an under-pressure must be reached on the opposite side of the deformation in the chamber K, which can allow additional intake of air from the outside of the tire P. This must be ensured by forces acting on the walls of the chamber K causing its closure. So there must be a sufficient pressure of the ring towards the chamber K. Whereas the pressure of the air tube D and thus also the pressure of the tire P act on the ring OK from one side and a same or just slightly higher pressure of the air in the chamber K from the other side this can be ensured e.g. by the mere pressure of the air tube D on the ring OK, alternatively enhanced by the centrifugal force acting on the ring OK in direction of closure of the chamber K. If this is not sufficient the ring OK can be made of more rigid material where its pretension can further act in direction of closure of the chamber K. Likewise, the area which the pressure of the tire P acts on can be enlarged for this purpose compared to the area by which the pressure of air compressed in the chamber K can act against it so that the total force in the direction of closure of the chamber K is greater than the force pointing against the closure of the chamber K.

The chamber K must be connected to its input and output, or to the control element ideally placed at the rim. Interconnecting interfaces need to be created. These must be through-going, for the output from the chamber K they can keep their throughput because there is same pressure or overpressure against the pressure of the tire P inside them, however, on the inputs an under-pressure can occur inside the interfaces which could collapse their walls together and disable the air flow by means of it or make it more difficult. Therefore it is advisable to use interfaces with a defined cross-section ensured by the shape stability of their walls so that they can withstand the ambient pressure, which is the pressure of the tire P. The air flowing upon their partial collapse could also build up excessive heat which is undesirable. The interfaces can be placed in a recess in the wall of the tire P or air tube D.

The chamber K with the ring OK can be integrated into the air tube D, which would make both its manufacture and assembly easier.

The ring OK can have an adjustable length; thus it can stretch or shrink depending on the diameter of the tire P into which the ring OK with the chamber K is being placed. One ring OK with the chamber K, alternatively the air tube D with ring OK and chamber K can then be used for different diameters of tires P, with only the length of the ring OK adjusted each time. The ring needs not necessarily be an independent part, the chamber K itself, with a defined length in point of contact with the air tube of the tire P, can take over its task.

Figure 5C:
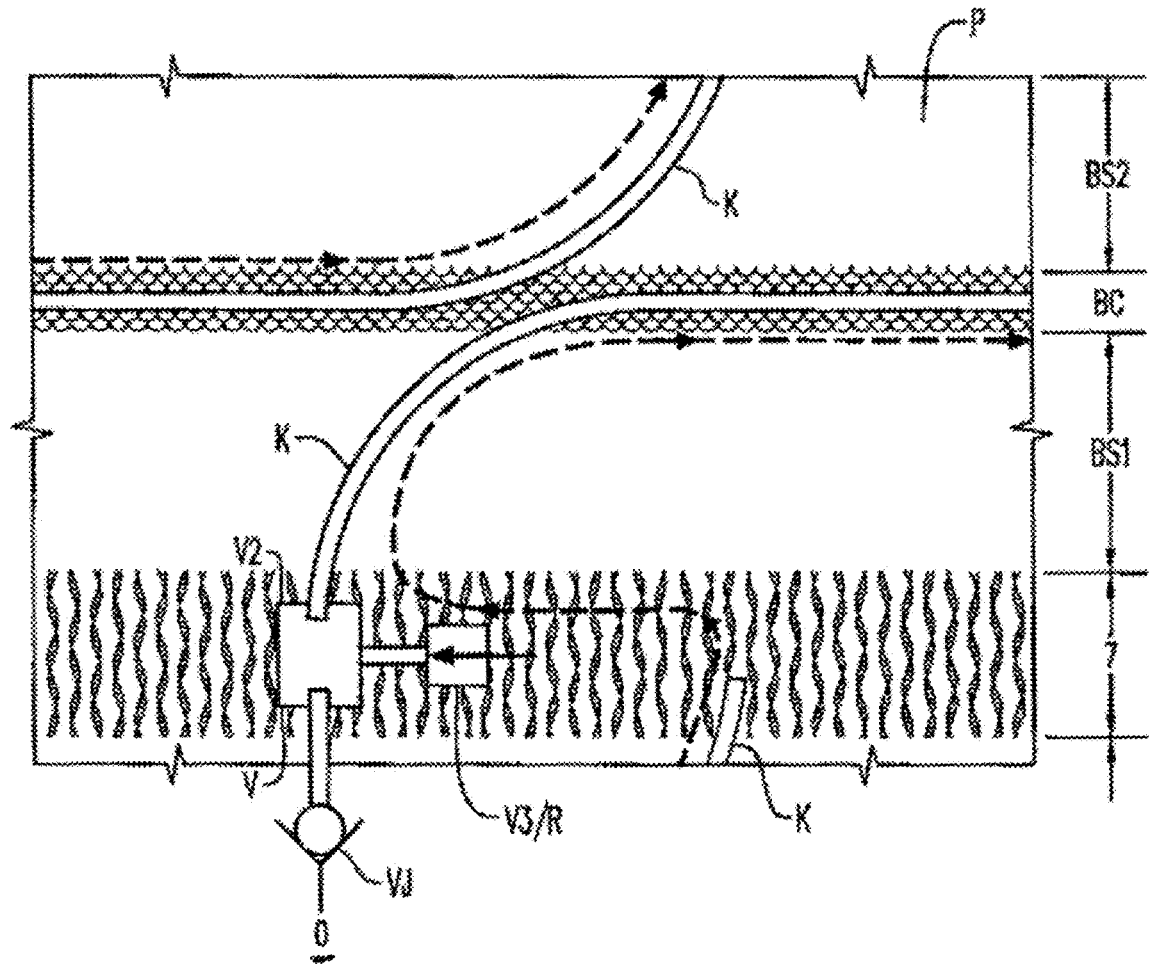

FIG. 5C shows the whole system in one of its simplest design types, intended for a bicycle in this example. The figure shows a unrolled bicycle tire in the complete cross-section and in the part of the length of tire P and rim 7, where the chamber K is integrated in the bicycle tire. The chamber K begins inside the 3-way valve V which is located on the rim 7, then it continues with the side wall BS1 of tire P into the tread part BC of tire P, which copies the whole perimeter of the tire P and returns to the rim 7 along the side wall BS2 of tire P where it opens into the internal space of tire P. The chamber K in this case needs not continue as far as back to the rim 7 as is shown in the figure but can open into the internal space of tire P already by the tread BC. The broken arrow shows internal air circulation from within the tire P through the control element R and input V3 of the 3-way valve V into the chamber K, by which it is moved mainly along the tread back into the tire P. Only in an underinflated tire the input V3 is closed by the control element R; however, the air keeps to be drawn out of the space of the 3-way valve V, in which vacuum generates and which draws in the air from the external environment O through the non-return valve JV until the input V3 is unblocked by the control element R. This element can be controlled automatically or manually. The whole assembly in this figure simply consists only of or comprises the chamber K interconnected with the control element R and the nonreturn valve JV.

In another example, another way how to fix the ring OK is to set it from the walls of tire P using the walls of chamber K. The chamber K thus fills up the space between the ring OK and wall of tire P while the ring OK in point of deformation of the tire P pushes against the chamber K because of its pretension, which can be set by the rigidity of the ring OK or by the increased rigidity of the walls of chamber K aside from the point of deformation of the chamber K. The tire P deforms the chamber K in a relatively short section of its length and thus, even though the wall of chamber K collapses in point of deformation and closes down, the rest of the chamber K can hold the ring OK in the right distance thus helping to increase the rigidity of the ring OK in point of deformation. This can be further assisted so that the chamber K has a sufficient lengthwise rigidity which can prevent the connected ring OK from offset. The rigidity of the ring OK preventing its deflection can be increased by making it T-shaped or alike.

Because in this case the pressure within the tire P acts on the external walls of chamber K it could collapse towards the ring OK along the whole length of the chamber K and this chamber would not function. This can be prevented if the chamber K is made with sufficiently rigid walls or with pretension of its walls or if it is connected with the tire P, where the chamber K wall touching the tire P wall is glued to this wall or is integrated in it or made as a part of the tire P directly during its manufacture.

Figure 5D:
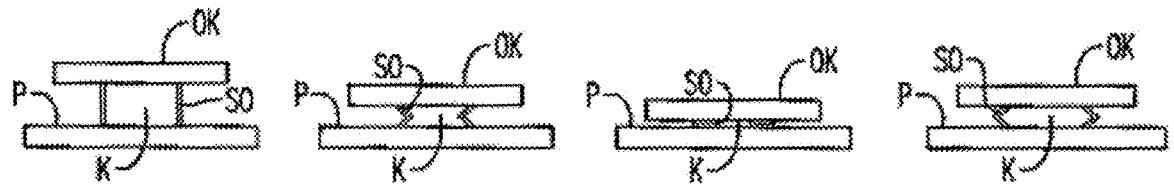

The FIG. 5D, first panel shows an exemplary design of the chamber K with pre-tensioned walls stretched between the wall of the tire P and the ring OK in point where the chamber K is not loaded by the deformation of the tire P. On the contrary, the FIG. 5D, second panel shows the beginning deformation of the tire P where the walls of the chamber K start to collapse due to the pressure between the tire P and the ring OK and also due to the pressure of air in the tire P, which is ambient to the chamber K in this case. FIG. 5D, third panel shows a fully closed chamber K where the gray side walls are collapsed towards the chamber K center. FIG. 5D, third panel shows a white residual of an unclosed space between the walls of the chamber K, nevertheless, it is only so as to show the side walls of the chamber K folded down between the ring OK and the tire P wall. In practice, the side walls can be negligibly thin, or a recess in the ring OK or in the tire P wall can be made for them, or the folded walls themselves can fill the empty space between them if their common "folded" length is equal to their original distance. All the walls of the chamber K can thus bear on themselves and seal the chamber K hermetically. If the chamber K is made independent on the tire P it can be attached to the tire P, apart from the aforementioned gluing, also using e.g. a sectional lock created on the tire P wall. Effectively, the upper wall of chamber K can be created on a different pre-tensioned ring copying the tire P wall, fixed to the tire P or not. In practice, the height of the chamber K can be in the range of millimeters or even tenths of millimeters, which can make the pretension of chamber K side walls even easier. These walls can be tensioned up even by a mere pressure difference between the pressure inside and outside the chamber K.

The FIG. 5D panels show the width of the ring OK, which is affected by the tire P internal pressure from one side, apparently bigger than the width of the chamber K acting on the ring OK from the opposite side. This difference can ensure that the force pointing towards the closure of the chamber K was always higher than the push-away of the ring OK from the chamber K and its non-closure. Effectively, the whole side of the ring OK pushing on the chamber K is hermetically isolated from the inside of the tire. This hermetically isolated part can have a breather.

Despite that the chamber K opens into the tire P through its output by one its part where the deformation has not yet occurred, a light overpressure against the tire P can be generated within the chamber K. In fact, this can occur there in raised speeds. It can also happen if the output into the tire P is fitted with a non-return valve because of the resistance of this valve. If this overpressure was desirable but not sufficient it can be increased by throttling the output of the chamber K. The overpressure allows the walls of the chamber K to expand evenly outwards the chamber K as in FIG. 5D, last panel.

Effectively, the chamber K can be made in such a way that it gets closed by deformation in two points at once near both its input and output. This can ensure the enhanced performance of the chamber K in this example because otherwise the chamber K would be filled by the air from the tire P at least once per turn, which would have to be first evacuated from it in every turn and only then a sufficient underpressure would occur so as to draw in the air from the source. However, if the ends of the chamber K are close enough to each other so that they both get closed by the deformation at once or if the ends of the chamber overlap a constant underpressure can be generated in the input of the chamber K. In the application as well as in this example we describe mainly a chamber provided with a valve in the input from the external environment, with the inner air circulation but the chamber K with a valve in the output into the tire P would behave in a similar way. For the sake of simplicity, the examples do not describe all versions of air circulation.

In another example, the chamber K can be made independent and it can be placed between the tire and air tube. FIG. 5A shows a chamber located on an unrolled outer area of the air tube with its components fixed on a strip of material ST where this strip ST is continuous along the whole wheel perimeter in the tread part BC, functioning as the ring OK. The strip ST is placed between the air tube D and the tire-casing P and it is fixed when the tube D is inflated. The input and output from the chamber K into the tube D can be solved like in FIG. 5C, i.e. leading directly into the tube D, nevertheless a case SC is added in FIG. 5A, which can have two functions. The first one is shown in FIG. 5A: The case SC protects the components and their placement, by the rim 7 in this instance, and interconnects the output from the chamber K and the input V3 with the interior of the air tube through a single output VSC. The other important function, which is not shown in this figure but in FIG. 6A, can be separation of air circulation from the internal space itself of the tire P or air tube D. In such a case the output VSC would be provided with a valve that would carry air from the case SC only if the tire P is underinflated.

The case SC would then be a separate pressure space with a maintained preset pressure and the case SC would then function as a compressed air reservoir. It has the advantage that if the chamber or its components are damaged it can not let the air of the tire P out. Also if the chamber made in this way leaks the air into the external environment from some reason it does not need to be of a too tight design. The case can pressurize back to its preset value when the wheel starts moving. This can be beneficial especially in case of the external circulation when the input and output of the chamber open into the case SC and the case SC is also interconnected with the external environment 0 and the output of the chamber K is rerouted directly into the tire P only when it is underinflated. The case has inside itself the pressure equal to the ambient pressure i.e. 1A, and the air circulates only between the chamber K and case SC and the case SC sucks in the air from the ambient O only when the tire P is being inflated. A valve can be placed between the case SC and the ambient O but not necessarily; there is not a major suction from the external environment O into the case SC until the inflation starts. Such a design can prevent constant pumping the ambient air through the chamber K along with its contaminants. The width of the chamber K and ring OK is relatively negligible and the air tube walls can wrap it and can set themselves against the tire inner wall. If the chamber K or ring OK were wider the air tube would expand towards the sides rather than upwards thus decreasing the diameter of the tire P which would then leave no space for the chamber K. This can be prevented by the above-mentioned narrow chamber, profiled wall of the tire P or ring OK in point of contact with the tube and tire, or by placing the tube into the casing which would define its inflated section and leave space for the chamber K between the tube and tire.

The chamber K can be made quite simply between the tube and the wall of the tire P so that the chamber K can be defined by the wall of the tire P from the top, by the ring OK from the bottom and sealed by the side rings SO from the sides. The air tube D can bear on both the ring OK and side rings SO which can set them and at the same time it can push the side rings SO to the wall of the tire P. Pressing the side rings SO on the tire P wall can seal these components and disable air leak from the chamber behind the side rings. The condition for sealing is only a higher pressure between them than the pressure of air compressed in the chamber K. Again, this pressure can be reached by pre-tensioning the side rings SO against the tire P wall and/or enlarging the area of the side ring on which the air tube D pushes in the direction of pressing against the tire wall. The FIG. 5D, first panel shows the chamber K made in this way where the contact area of the side ring SO with the tube is larger than the contact area of the side ring SO with the tire P wall.

In another example, the interfaces can be integrated in the wall of the tire P if they are manufactured together with the tire P; they can also be glued to the tire P wall, run in mounts designed for this purpose or they can be fixed by the pressure between the air tube and tire casing. Likewise they can have their own side rings SO which can define their volume as mentioned above to create the chamber. The role of air tube D can be assumed by rubber layer, thin foil, membrane, breathless textile or any other material which can, at least partly, separate the pressure space of the tire P from the casing of the tire P. Such a strip of material can also, for example, copy the chamber K lengthwise and make an airtight connection with the wall of tire P.

This design has an advantage that the air flowing through the chamber K and/or around it cools down the tire in every rotation. If the ambient of the chamber is not a part of the pressure space of the tire P it can be vented or the air can be exhausted from it through the chamber K when the pumping starts which can decrease the pressure around the chamber K for the inflating period thus increasing its rigidity in an opened state.

From the point of view of pumping the air by deformation the chamber K must not always get hermetically closed by the deformation, it is only necessary that a sufficient amount of air, or any other gas contained within, is evacuated from the chamber K in order to create vacuum during deformations or a pressure lower than the pressure of the source, which provides the gas, for example the ambient of the tire P.

In another example, if the chamber K is made separate from the tire P and its top wall in point of contact with the tire P wall or even the rest of the chamber ambient can be provided with soft rubber or foam etc. or with an inflated ring or pad which can absorb both lengthwise and lateral vibrations between the chamber and the tire P wall or the forces causing a temporary mutual lengthwise or lateral shift between the tire P and chamber K and at the same time it can define the distance of the chamber K from the tire P.

In another example, a device for adjustment of pressure in tires can include a chamber with shape memory (K) and a valve. The valve (V) is a three-way valve with inputs interconnected with the external environment (O) and the tire internal space (P), where one input (VI) is provided with a valve (JV), the next input (V2) is connected to the chamber with shape memory (K), and the last input (V3) is interconnected with the closure element (R).

This device allows, apart from others, internal or external air circulation between the chamber and the ambient of the tire or between the chamber K and the internal space of tire P. Apart from reduced stress of the chamber K and associated components due to the fact that the pressure inside the chamber K is relatively constant for most of its life, this allows to eliminate ineffective capacities in case the chamber K is made in such a way that it closes both at its input and output simultaneously at least once in a revolution. For the chamber K made in this way, it does not really matter how big are the volumes of the interfaces, because the chamber K can empty these interfaces at the moment of pumping and create a permanent vacuum or overpressure on its input. This principle has been mentioned in the Example 4. The device according to this Application can significantly show this advantage for the reason that the chamber K placed at the tread is relatively far off the rim and interconnecting interfaces can be relatively long and with big inner volume.

In another example, the tubeless tire P can contain a chamber K which opens into the backup tube D (or any other closed contractible or collapsible bag) by its end. If then there is an air leak from the tire P the chamber can reinflate the tube D which can gradually fill up the volume of the tire P and keep it drivable even in case the tire P is damaged and leaking.

For example, the contracted air tube can be wound up on the rim which can then inflate only when the tire P is damaged. Such an exemplary design is shown in FIG. 6A where the output VSC from the case SC is interconnected with the non-return through-put valve VP into so far uninflated tube D represented here by the balloon.

Because an undamaged tire P typically leaks by several percent in a month, and in this case, the gradually inflating tube D would be inappropriate because a half-inflated tube D could, for example, flutter inside the tire P, this can be prevented in several ways. The air tube D can be provided with an opening leading into the tire P where the tube D is being reinflated with the air compensating the general leaking of the tire P and/or air flows through the tube D during the internal circulation and this air escapes from the tube D through the opening into the tire P. Because the tube D is pre-tensioned it itself tries to get rid of this air and push it out into the tire P. Only if the tire P leaks with a higher rate and reinflation then takes a longer time the air from the tube D will not make it into the tire P in time and the tube D will then fill up the whole inner volume of the tire P. The size of the opening from the tube D into the tire P can be predefined or it can be controlled or closed by any control element, throttle valve or closing valve, or by the pressure inside the tire P so the throttling of this opening when more air comes into the tube D than it leaves into the tire P through the opening the air tube D can cause reinflating.

Effectively, the control element controlling the opening between the tube D and tire P can be the same control element which closes the last input V3 of the 3-way valve V. This element can thus close both the input V3 and the opening from the tube D into the tire P in one action or it can be a two-position controller which only closes the input V3 when the pressure is low and leave the opening from the tube D into the tire P open; when there is a major decrease in pressure in the tire P it can close the opening from the tube D into the tire P too.

Even the case SC itself can consist of or comprises the contracted tube D. Such an example could be described using the FIG. 5A where SC=D and if the tire P leaks faster than being filled through the output VSC (the rate of which is given by its throughput, resistance, and/or throttling; alternatively it can be fitted with a valve) the tube D can be expanding, until it fills up the whole volume of the tire P. If the output VSC then closes the tube D can fully replace the sealing function of the tire P.

In another example, the control element can control the air inlet of the tube D. In case of properly inflated tire P the air circulates between the tire P and chamber K or between the external environment O and chamber K. Only when the closure element R activates and the input V3 closes the air, originally flowing from the chamber K into the external environment O or into the internal environment of the tire P, can be redirected so that it flows directly into the tube D. Again, the closure element R can be a multi-position/multi direction element which directs the air from the chamber K into the tire P except the tube D in little leaking, and only for major and/or faster leaking it directs the air from the chamber K into the tube D.

Also the closure element R can, in case of internal circulation in major leaking, first only redirect the output from the chamber K into the tube D while the input of the chamber K stays opened into the tire P and first the already compressed air is just shifted from the tire P into the tube D and only after that the input of the chamber K can close temporarily or permanently and if the tire P is still underinflated it can continue to draw air from the ambient O through the non-return valve and the chamber K into the tire P. Such repumping of air is advantageous because the chamber K has a set working volume and repumping of e.g. 1 liter of air under the pressure of 3 A from the tire is more advantageous than repumping of 1 liter of air under the ambient pressure of 1 A from the external environment O.

Likewise in case of external air circulation when in a properly inflated tire P the air only moves from the external environment O into the chamber K and back and for a small drop of pressure the air can be drawn in from the external environment O through the chamber K and then through the non-return valve directly into the tire P or tube D which can again be provided with an opening interconnecting the tube and tire P. Only in a major leak the air from the chamber K. can then be rerouted directly into the tube D. Also in this case, the chamber K suction can be first redirected by the control element R so that the compressed air is first repumped from the tire P into the tube D and only then reinflated from the external environment O. The control element R can be more than a two-position controller depending on how many combinations need to be used.

In another example, to function properly the control element must be at least partly placed in the environment, which it controls in terms of pressure. If the pressure inside the tire P drops rapidly and the sealing function of the tire P is replaced by the sealing function of the tube D it is advisable to interconnect the control element R with the inner environment of the tube D. This can be achieved by placing the control element R into an isolated space interconnected with the internal space of the tire P. Only if the sealing function of the tire P is replaced by the sealing function of the tube, or there is a rapid or significant air leak from the tire P, this interconnection can interrupt and it can be replaced by the interconnection of this isolated space with the tube. Until this moment, the isolated space with the control element R can be only interconnected with the tire P or with both the tire P and the tube. This moment and the change of interconnection can be set and initiated directly by the control element or also, for example, by the inflation of the tube D up to a certain set value when the wall of the tube D mechanically changes the interconnection of this space. Effectively, this space can then be interconnected with the opening from the tube D into the tire P where this space can also get separated from the inside of the tire P after the opening closes, the interconnection with the tire can stay, however.

If the control element is controlled by electronic means based on data from sensors, independent sensors can be placed inside the tire and the tube, the control element can only be controlled by the sensor located within the sealed environment. However, the sensor can be placed even in a completely separated space, for example, in a sealed bag, which, at least partly, is pressed by the air in the tire P or by the wall of the tube D when it gets inflated and fills up the inner space of tire P.

Replacement of the sealing function by the tube can be indicated to the driver or rider for example by electronic means or even optically when for example the tube D that is being reinflated or the control element or disconnection of the tire. P from the space of the control element placement can slide out a visible indicator from the rim or the wall of tire P can be provided with a transparent window on which the visible wall of the tube D presses etc.

The chamber K mentioned in the examples above is placed by the tread of the tire P, however, it can also be placed anywhere where the distance of the walls of tire(s) P or loaded rim changes.

In another example, the space for the chamber K can be made by inserting a cradle HR between the tire P and rim 7 as in FIGS. 7A to 7C. The FIG. 7A shows the assembly without the cradle, FIG. 7B then the tire P loaded by deformation with the cradle HR, and FIG. 7C shows an unloaded tire P with the cradle HR. A space has been created between the tire P and rim 7 with the use of the cradle HR where the deformation of tire P is bigger than in the assembly shown in FIG. 7A where the deformation would not occur at this place or it would be minimum. The cradle HR can be independent or a part of the tire P or rim 7.

In another example, a chamber K or any pump can be inserted between the two coupled wheels, for example, in dual tires. FIGS. 8A-8G show the chamber K placed between two tires P' and P'''. Top of the figure shows a chamber K as through-put in an unloaded point, the bottom of the figure shows the chamber K closed by mutual approximation of the deformed tires P' and P''' in point of load.

The chamber K can be fixed to the rim 7 or one of the tires P but effectively a ringlet with the chamber with a profile corresponding to the profiles of tire walls can be just placed between the two tires. Such a ringlet, if balanced, can have a tendency to stay concentric with the wheels. At the same time, it can be pre-tensioned against the walls of tires or placed on the w all in such a manner that the converging walls of tires make a narrowing above it.

The chamber can also be inserted between the tires step by step when the chamber K is integral or in the shape of a strip with a defined section width which is gradually wound between the tires and when it is wound up the ends get connected by a lock. In this way a chamber with overlapping ends can be simply created as in FIG. 8B where after winding-up the chamber K is constricted and fixed by the tape B with a lock ZA. Likewise, the chamber can lock by itself without the need of the tape B. The tape can make a protection against punctures etc. or it can function as a template for finding a right place with a suitable distance between the tires etc. The winding-up chamber is advantageous due to its simple installation and versatility when one width of the chamber K can be used for different tire profiles or for tires with various distances.

The FIG. 7A does not show proper proportions; in fact, both overlapping ends of the chamber can be placed almost in the same distance from the axis of rotation (the chamber K can have a minimum diameter or distances of its walls in the range of tenths of millimeters and therefore the difference of the distances of overlapping ends of the chamber K from the rotation axis can be negligible with respect to the radius on which the chamber ends can lie). Therefore the distance of the walls of the neighboring tires should be similar at both ends of the chamber K; if this is not the case the chamber K can be profiled in such a way that it compensates this difference.

Figure 8A:
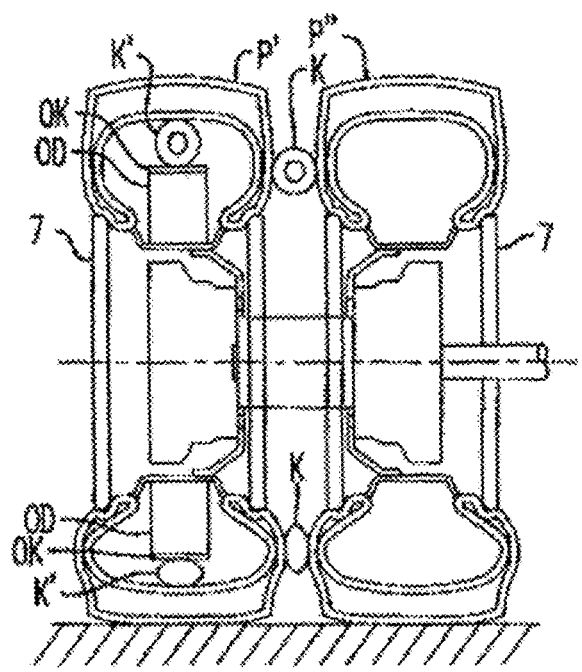
Figure 8B:
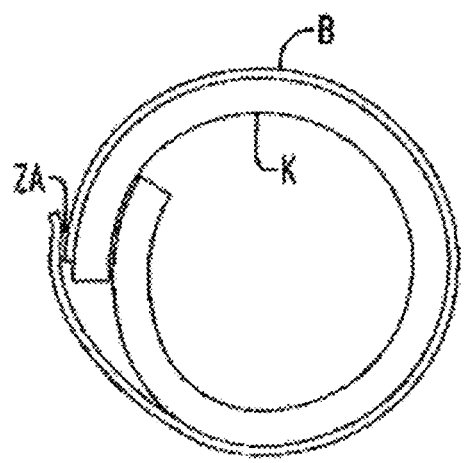
Figures 8C, 8D:
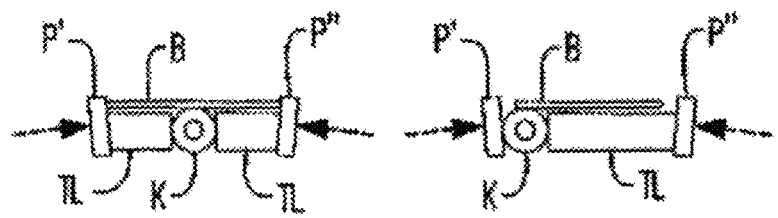

FIG. 8C shows a cross-section of the chamber placed between two ties TL which set it from the walls of the tires P' and P'''. The chamber K and ties TL are fixed by the tape B in a proper radius. The broken arrows show the direction of the movement of walls of the tires when loaded; this movement can then close the chamber K by the use of ties TL.

The FIG. 8D shows a similar situation, only with the chamber K placed directly by the wall of the tire P'.

In another example, FIG. 8A shows the chamber K bearing against the pressure intensifier MU which again is bearing against the tie TL which is in this case inflated up to the pressure of the tire P. Because the pressure intensifier MU has a larger area adjoining the tie TL than the area adjoining the chamber the air being compressed in the chamber K up to the pressure of tire P has not enough power to force away the pressure intensifier MU into the tie TL and this can always result in closing the chamber K by the deformation of the tires. However, if the tire deformation is larger than necessary just to close the chamber the inflated tie TL can partly collapse for the period of such deformation and then it can straighten back with full retention of the chamber K function.

In the above example the tie TL was inflated up to the pressure of tire P. However, that is not necessary if the tie TL is interconnected with the output of the chamber which results in inflation of the tie TL by the chamber K and due to the pressure intensifier the chamber can always be able to reach a higher pressure than the pressure in the tie TL and it can thus reinflate it up to the preset value of the pressure. The tie TL can be used as a compressed air reservoir or as a case SC.

Figures 8E, 8F:
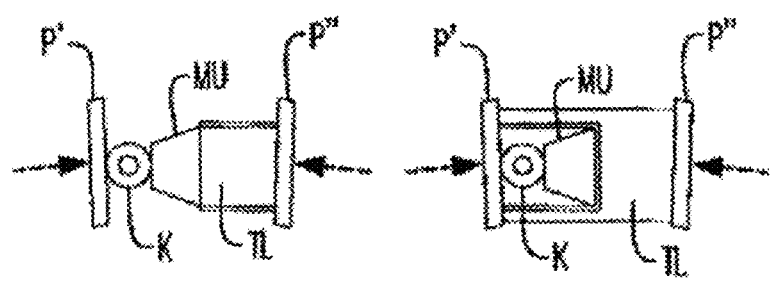

FIG. 8F shows a similar situation but the tie TL overlaps the chamber K by its narrow ends towards the wall of the tire P' and sets the right distance of the chamber K from this wall. Upon the tire deformation the chamber K and these narrow ends of the tie collapse as first and reinflation starts.

Figure 8G:
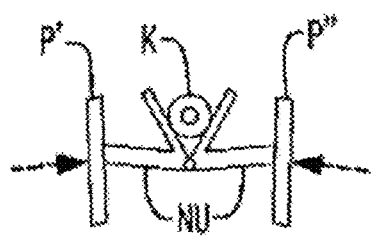

The FIG. 8G shows the ties provided with a joint thus making a lever NU which can enhance the force closing the chamber K.

The devices shown in FIGS. 8A-8G are described for dual tires, nevertheless, they can function alike even for separate tires P, for example, between the tire P and rim 7, or between the opposing walls of the tire P. Likewise the tie TL can absorb an excessive deformation if connected with the rim or tire. The deformational capacity of the tie TL can also be ensured by pie-springing; instead of inflation it can be made e.g. using a spring sheet etc. The advantage of the inflated tie lies mainly in its light weight while being firmly fixed in place; it makes easier the assembly and finding the right place especially in combination with the winding-up chamber K, at the same time it can make a reservoir or reference space while also solving the problem of excessive deformation when it simply evades it while first closing the chamber K by the deformation.

Figures 9A, 9B, 9C, 9D:
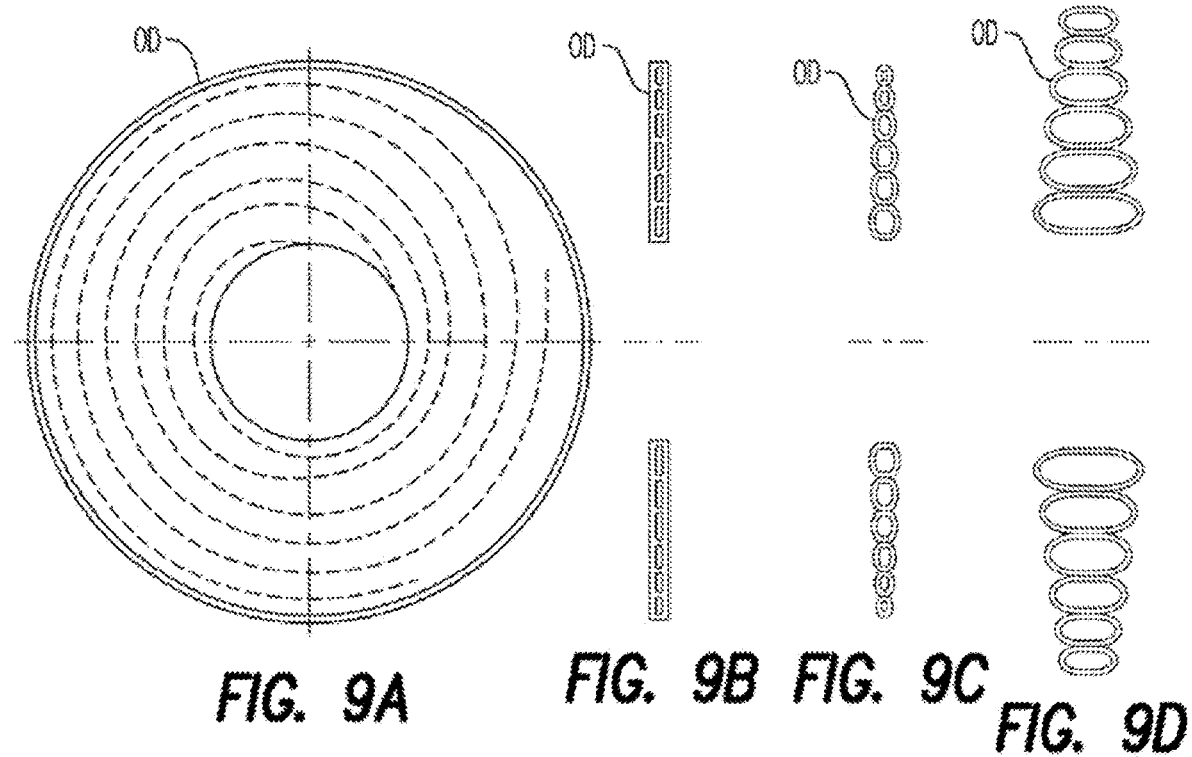

In another example, FIG. 8A also shows the chamber K' in the tire P' where the chamber K' with the ring OK is placed on the base OD. This can be simply in form of a rigid circle ring placed on the rim 7, however, it can be replaced by a deformation zone absorbing the excessive tire deformations. Effectively, such a design has a shape shown in FIG. 9A where a rubber, textile, or alike circle ring consists of or comprises two layers of material joined along external and internal circle ring perimeter. Moreover, they can be, as in the figure, interlinked by a seam, for instance. It is there to define the section of the base OD after its inflation. The seam is represented by a broken line. The section of an uninflated circle ring of the base OD is then shown in FIG. 9B, a partly inflated one in FIG. 9C and fully inflated one in FIG. 9D. Its maximum inflated diameter can be built-in or defined by the ring OK and it can be interconnected with the rim 7 from the bottom.

The base OD can have its own designed pretension and get inflated up to the pressure of tire P; effectively, it can also be deflated and unrolled by the rim 7 on the condition that when its underinflation is detected the air can be let into it from the tire P and it can expand up to its full diameter due to the pretension or centrifugal force. If it has unrolled mainly due to the centrifugal force it can retract to its inrolled position after stopping either because of the pretension of its walls or because of its deflation. The base OD, if unrolled by the centrifugal force, needs not contain the inflatable components and can stay in its unrolled position because of the centrifugal force while, however, it can act against the tire P or chamber K not only by the centrifugal force but even because it is rigid in the direction perpendicular to the direction of the tire deformation or it can spring upon the excessive deformation of the tire P. Such an example is shown in FIG. 10B where the base is in its inrolled position and it is unrolled by the centrifugal force in FIG. 10C. Its three components have swiveled clockwise round the joints represented by black spots and have taken up a position with the base rigid in the direction of the movement of the tire wall. A line perpendicular to the rotation axis is represented by a dotted line. The design can retract to its inrolled position, for example, due to the springs in the joints after the centrifugal force ceases. This design is only an example, likewise, the components can move into each other using the guide ways etc. The pump placed at the end can copy a part of the tire P perimeter or even its whole perimeter. Because the perimeter is shorter at the rim than at the tire P the longer pump could overlap in its inrolled position and unroll gradually or it could be crimped etc. If the base OD is inflatable it can be effectively inflated up to a higher pressure than the tire P. This can ensure the stability and a simpler design of the base OD.

The inflated base OD can also be used effectively as a compressed air source similar to the case SC described in the Example 5. Thus the chamber K can reinflate the base OD from which the tire P can be refilled as necessary. For example, the base can have a pressure of 3.5 A, the passageway valve of the tire can have a resistance of 0.5 A and properly inflated tire can have a pressure of 3 A. If the tire pressure drops down the passageway valve can open, the tire P can gradually reinflate from the base OD and the chamber K can reinflate the base OD in parallel from the external environment O up to the original pressure of 3.5 A. It is just good to ensure that the drop of air in the base OD, which would affect its supporting function, is slower than its refilling from the chamber K into the base OD. However, this should actually not happen because the pressure in the ring OD can always be higher than the pressure in the tire.

The seam joining the walls of the base OD can be designed in such a way that it keeps the walls of the base joined only in certain pressure difference between the tire P and base OD. If the passageway valve between the base OD and tire P is rated so that it can compensate only a limited leak rate from the tire P, and the real leak is higher than that, then the pressure difference between the base OD and the tire can increase, the base OD can try to expand and an increasing force can act on the seam. Upon a certain pressure difference the seam can rip and the walls of the base OD can be expanding until they fill up the whole volume of the tire. The base can thus function likewise the tire tube D in case of big tire puncture. The seam can have a defined weak spot so that it rips only in the right moment and also step by step and safely. Effectively, the output pressure of the chamber K can be lowered from 3.5 A down to 3 A after the seam rupture.

If the pressure of the base OD equals to the pressure of the tire P and the base OD is held in place e.g. by rigidity of its walls, pre-tensioned ring OK, or by the fact that it separates two pressure spaces of the tire P lengthwise this can function in a similar way, only the output pressure of the chamber K can not have to be lowered.

Both the chamber K and base OD and all the components can then occupy relatively little space within the tire P and at the same time they can be quite rigid and yet they can compensate typical leaks as well as seal the tire in case of its puncture.

In another example, each tire has an optimum height of deformation, which is difficult to keep in practice due to changing conditions of loading by cargo etc. The chamber placed on the base OD can be designed so that it closes completely only if the tire deforms more than appropriately when loaded. At the same time, the inflatable cushion in form of the base OD can ensure that pumping can start even if the deformation is larger than necessary for pumping; the pump can simply evade the deformation or an excessive deformation can be absorbed by the air cushion. This air cushion can be replaced by spring material etc. If the tire P needs to be relieved it can be provided with a bleeder valve or it can get down to a lower pressure than the set value by regular leaks. These can be increased also by choosing low grade materials for tire sealing layers which can result in further production savings.

The inflatable circle ring can be very simply inserted between the tire P and rim 7 and the next steps of the assembly can be as follows: Inflate the air into the chamber K. From there it proceeds to the base OD, which can get inflated and erected and fixed against the rim 7, tire P perimeter, or both. Then the air leaks out of the base OD into the tire P, directly or through the valve, and inflates it. When the tire P is inflated, all the components have the optimum pressure and the system tries to hold it during the drive. If the system includes the control element R in form of a reference space containing the compressed air as a reference medium this reference space can be interconnected with the tire space by a non-return valve. The reference space gets inflated through the non-return valve along with the tire. Then the control element R can try to hold the same conditions. The increase of the set pressure can then be achieved by a mere inflation of the tire P up to a higher pressure which can result in recalibration of the control element R to the new pressure value.

In another example, so far we have described mainly a spiral-shaped inflatable base OD but it can also be in the shape of concentric circles or alike or it can also be in form of a relatively low base OD located on a rigid cushion. The spiral can be created by winding up of one or more hoses onto each other where the layers can join by a lock, e.g. a bur-fastener. The layer can have a precisely defined maximum cross-section or length regardless of the internal pressure in the layer. If there is an inflated circle layer with a defined cross-section with a 1 cm high wall, for example, W between the chamber K and the tire P wall the chamber K can be loaded only if the tire P is deformed by 1 cm. If this circle has a variable length it can be inflating until the moment when it leans against the tire P wall. Thus the distance between the chamber and tire P can be set. This circle can have a different pressure than the pressure of the base OD so that the tire gets over it to, the chamber K more easily.

Apart from its setting function, this circle can be a stabilizing support in order to anchor the whole assembly by the rim as well as by the tire. The base OD can contain vents so that it does not divide the tire into sealed parts if required by the application; on the other hand, if the assembly is more stable because it is supported by independent pressure spaces from both sides they can be hermetically divided or at least minimize the interchange of air between these spaces of the tire P. These spaces can be interconnected by valves with resistance in one way, the valves that can open only in a certain pressure difference between the spaces through throttle valves or throttle holes. Basically, the whole base OD can be made only by a membrane or rigid wall separating the two parts of the tire which is held in place by the pressure balance from its sides. However, it should be pre-tensioned in its larger diameter or the spaces should be hermetically divided or it itself must have a sufficient structural rigidity in order not to collapse. Alternatively, the base OD can be made by the walls of two parallel tubes running through the tire as indicated in FIG. 10A or it can run in between them. Effectively, the tubes can be a part of one air tube D; they can be even made of several different air tubes if the air tube D intersects at least in one point. In the figure, the tubes are designated as D and D' while their walls are represented by a dotted or broken line, respectively.

The opposite side of the chamber can then make a lock which can lock the maximum diameter of the base OD. For example, a bur-fastener tape can be attached to this side of the chamber and the opposite tape can gradually expand along the increasing perimeter of the base OD until the moment when both tapes touch and join. At this moment, the diameters of all assembly layers can be fixed. In this way, an all-purpose assembly for different diameters of tires and rims can be made. The chamber K can be interconnected with the components by the rim very easily along the wall of the base OD or under it.

During the assembly, the base OD can be an incomplete circle, i.e. without e.g. a circular sector and when it gets inflated (or deflated, depending on what forces it to take the right position) it can expand to the complete circle. A joint can occur in point of the closed circular sector and the walls of this joint can fix the interface hoses, reference space, etc. Likewise, the air tube can be interrupted in one point and make an incomplete circle where the faces of this circle can join only when they get inflated. An intake into the chamber K from the rim etc. can then run between those faces.

Figures 9E, 9F, 9G, 9H, 9I:
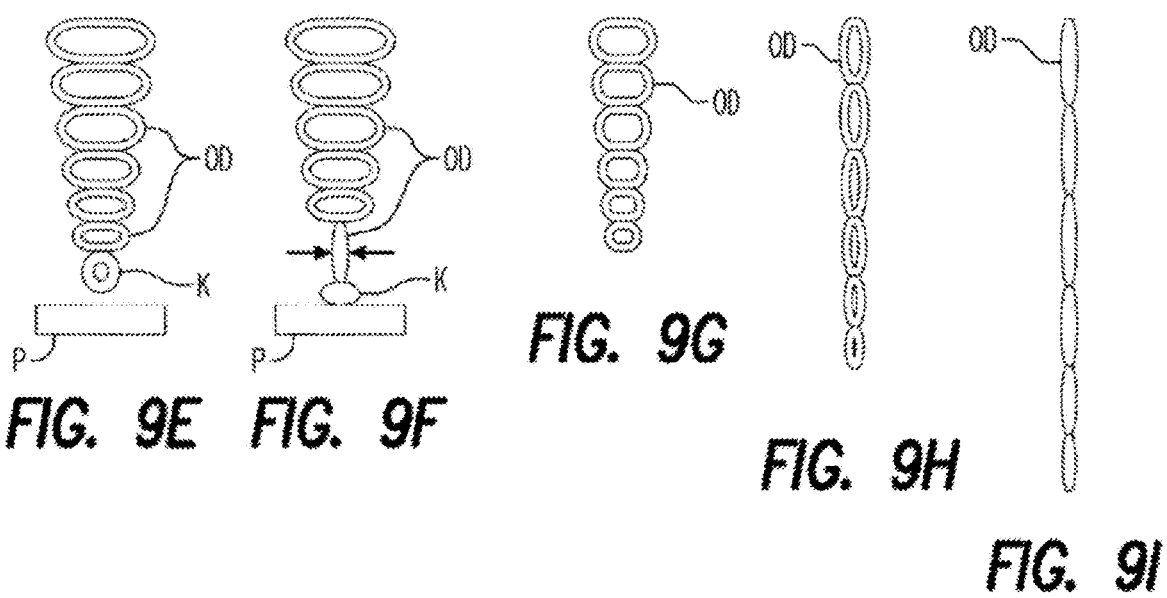

In another example, a chamber or a pump need not be fully loaded until it is necessary. The FIG. 9E shows the chamber K on the base OD away from the tire P even though the tire P is deformed in this point. The base OD consists of or comprises hollow concentric circles inflated to a pressure higher than the ambient pressure of the tire. For example, they have been inflated manually in one go up to the pressure of the tires P. When an underinflation of the tire P is detected the last circle under the chamber K can be deflated into the external environment 0 of the tire P. The pressure in the tire can push on the walls of this circle and lower its volume down to the lowest possible value; at the same time, the walls can assume the pre-stressed position which can shift the chamber K towards the tire P as in FIG. 9F. The FIG. 9G shows a similar deflation and expansion of the whole support OD.

The FIG. 9J shows the base OD with the seams represented by a broken line which runs from the rim 7 towards the perimeter of the base OD. These seams can set the spaces partly divided between them and thus also the distance of the opposing walls of the base OD when they are inflated to a typical pressure. At the same time, they can make a relatively uniform circular space at the end between the end of the seam and the perimeter of the base OD. This can be supported by another circular joint between the seam ends and the perimeter of the base OD, which can make a bumper space over itself and absorb possible excessive deformations, which could damage the seam. The seam can be damaged in this way mainly because of the pressure difference between the base OD and the tire P or another predefined mechanical impulse. Such a base can be easily manufactured as a spiral-shaped overlapping e.g. of one piece of material in multiple layers and then its joining in points of the seam represented by a broken line and permanent joints represented by a double-dotted line. The chamber K can also be made in this way, between the two permanent circumferential joints where it can function even as a ring OK if its bottom joint is firm and wide enough. Thus the whole system can be made in a single operation where the layers are joined for example by rubber vulcanization in a mould which can press together only the spots of permanent joints and seams. The FIG. 9K shows the same base in section before joining its layers where the future joints are designated by the letter X. The arrow around the base in FIG. 9J shows the length of permanent joints and thus also the length of the chamber K in this example, it is then possible to make even the chamber K in one step arbitrarily longer than the tire P perimeter. The number of the layers joined is not limited. The chamber K can overlap not only lengthwise side by side but also one above another vertically so that the chamber can be wound up in a spiral way. Also this can be achieved in one fabrication step.

The FIGS. 9L and 9M show other design types of the base OD where this is being wound up in form of a twisted-pair in layers one upon another, which can ensure its side stability. If a wire, represented by a gray pentacle, runs through the center of the twisted-pair it can draw the opposing cylinders of the twisted-pair together as well as to the rim 7. The chamber K can lie on the last layer or it can be separated from the tire by another twisted-pair layer effectively not joined with the layers of twisted-pair under the chamber K. The FIG. 9M shows a narrower twisted-pair without the chamber K being overlapped by another twisted-pair layer.

If the chamber K is being wound up in a spiral way and the wire defines the maximum length of the twisted-pair the inner and outer circumference of the base can rotate when being inflated. If the wire can then join the tire P or rim 7 or another interconnected component by its end this can also define the diameter of the base OD. The inflatable part of the base OD can have a larger diameter before inflation than the diameter of the rim 7 which can make it seated on the rim 7. If it was previously connected with the tire P it would be simply mounted together with the tire P. Likewise, the base can be placed on the rim during the assembly and its maximum circumference is lower than the circumference of the bead or inner side of the tread, which can make the mounting of the tire P easier. After inflation the base OD can erect itself into the tire P and take its final shape. The base OD expanding in this way can, for example, fix the interface hoses, that have been until then freely uncoiling, below the bottom part of the base OD. Only after it seats firmly on the rim; after the final inflation it can also finally fix other parts between the tire and rim such as pressure sensors, a power generator, etc.

In another example, FIGS. 11A to 15C show the chamber K divided into two parts KS and KC. Even though there are cases when it can be a higher pressure in one part of the divided chamber K than in the other the part with the lower pressure, it can still compress the other part with a higher pressure. This can be achieved for example by using a pressure intensifier MU or a different type of a lever.

These examples describe mainly the separated parts of the chamber K where always at least one of them can be identical with the above-mentioned support OD, or with the tie TL, air tube D, etc.

Figure 11A:
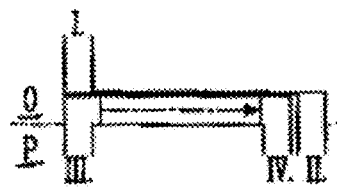

The FIG. 11A shows the chamber K divided lengthwise, with 4 openings running into the external environment O of the tire P or into the internal space of the tire P. In this example the opening I leads into the external environment O and the openings II to IV lead into the space P. The interface O/P (in fact, it is the wall of the tire P or rim 7 or other part separating the inside of the tire P from the outside of the tire P) is represented by a double-dotted line, the area above it is the external environment O and the area below it is the internal space of the tire P. When the tire P rotates the deformation of its wall rolls gradually through the chamber K and pushes the air within the chamber K ahead. The FIG. 11A shows a point through which the deformation of the chamber K passes as well as a depth of deformation, represented by a gray area. The direction in which the deformation moves is represented by a thin broken arrow in a gray field. The FIG. 11A is used to designate the inputs and to describe the way of passing of the deformation; in FIGS. 11B and 11C these designation are already omitted to keep it simple.

Figure 11B:
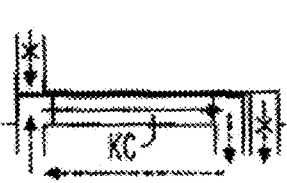

The FIG. 11B shows the openings III and IV as throughput and the lengthwise separated part of the chamber KC interconnected with them is filled up with air from the tire under the pressure of the tire. When the tire rolls the air circulates from the internal space of the tire P through the opening III, then through the chamber K (KC) and finally through the opening IV back to the tire. So this is only an internal circulation of air from the tire into the chamber and back. The lengthwise separated part of the chamber KS interconnected with the openings I and II is non-throughput in the whole length of the chamber K, because the whole volume of the chamber is already filled with the lengthwise separated part of the chamber KC. Thus, there is no transfer of air from the external environment O into the internal space of the tire P, which is indicated by broken arrows in the openings I and II.

Figure 11C:
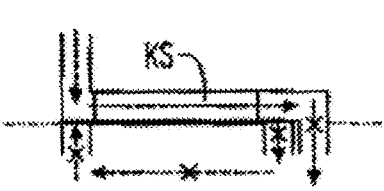

The FIG. 11C shows the opening HI (alternatively also IV) closed. The deformation has passed along the separated part of the chamber KC and pumped its air into the internal space of the tire P. Due to the vacuum generated inside it, the part of the chamber KC has contracted crosswise thus clearing the neighboring lengthwise part of the chamber KS. So the deformation now transfers the air from the external environment O into the internal space of the tire P through the openings I and II. Because the pressure in the tire is higher than the ambient pressure it is advisable that the part of the chamber KS is permanently interrupted either by the deformation, so the chamber is constantly interrupted by deformation at least in one point, and/or by one or more valves in order to prevent leaking during reinflation.

To stop pumping the opening III (or eventually IV) has to be opened, the part of the chamber KC can then get filled by the air from the tire which can block the part of the chamber KS. When the tire rolls only the internal circulation occurs as described in FIG. 11B. As described in this as well as other examples, if the part KC and/or KS is closed by deformation at both its input and output it can increase the pumping efficiency, nevertheless, it is needs not occur at both parts as the efficiency grows even when this happens at one part only; alternatively such closure can replace the need of some valves.

Figure 12A:
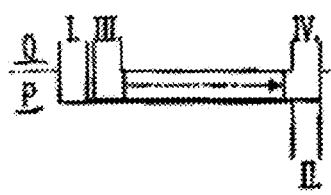

In another example, FIG. 12A shows a lengthwise divided chamber where the openings I, III, and PV lead to the external environment O and the opening leads to the space P in this example. The direction and extent of the chamber K deformation is represented by a gray thin flat broken arrow in a gray field.

Figure 12B:
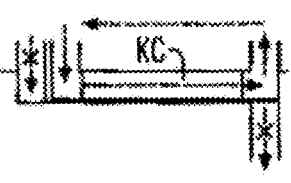

In FIG. 12B the opening II or I is provided with a non-return valve or the part KC presses on KS and at least in one point it constantly interrupts it and so it does not let the air from the tire into the external environment O through the lengthwise part of the chamber KS. The openings III and IV are open and the air circulates through them between the lengthwise part KC and the external environment O. The chamber KS is permanently crosswise compressed and not through-going. It is compressed by the pressure of the medium flowing in KC and the pressure of this medium on the lengthwise wall separating KC from KS. This pressure can be enhanced or replaced by pretension, enhanced by an pressure intensifier MU or the output IV can be throttled so that overpressure against KC occurs inside KC thus permanently blocking KS and avoiding compression of air drawn in from the ambient and its further transfer into the tire.

Figure 12C:
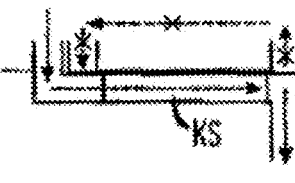

The opening III in FIG. 12C is closed which results in exhausting the air from the part of the chamber KC and pulling its walls together. This pulling together can clear the part of the chamber KS which can subsequently be filled with the air from the external environment 0 and then this air can get compressed against the valve at the opening H and then pumped into the tire. Again, any opening can be provided with valves. Each valve can also be replaced by the chamber interruption by deformation and by non-throughput crosswise interruption.

Figure 13A:
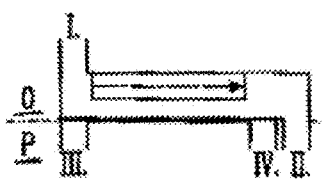

In another example, FIG. 13A shows a lengthwise divided chamber where the opening I leads to the external environment O and the openings H, III, and IV lead into the space P in this example. The direction and extent of the chamber K deformation is represented by a gray thin flat broken arrow in a gray field. The chamber is deeper than the deformation passing through it in this case.

Figure 13B:
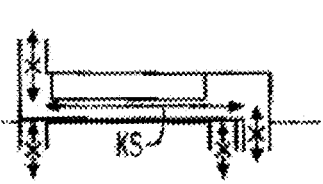

The FIG. 13B shows that the reinflation does not start in a chamber created in this way because its lengthwise part KS connected with the openings I and II is permanently through-going and the deformation in it does not cause necessary compression and transfer towards the tire. No reinflation or no pumping is represented here by crossed broken arrows at the openings I and II. In order to function properly it is necessary that a valve is placed for example at one of these openings or in between them, which can prevent leaking of air from the tire through the part of the chamber KS.

Figure 13C:
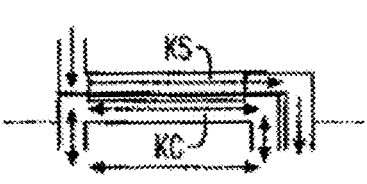

In FIG. 13C, the air from the tire is let into the part of the chamber KC, which can contract the section of the part KS and its depth. The chamber deformation can then close the part KS crosswise and transfer the air from the external environment O into the internal space of the tire. Thus the air from the tire can be let in the part KC only under the tire pressure or lower, but also higher if the deformation passes through a sufficient depth so that it first reinflates the air through the opening III into the chamber KS thus "inflating" this part up to the volume needed that is sufficient for crosswise contraction of the section of the part of chamber KS.

Figure 14A:
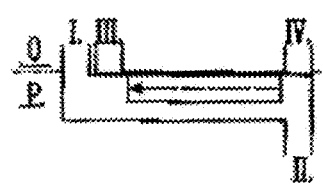

In another example, the FIG. 14A shows a lengthwise divided chamber where the openings I, HI, and IV lead to the external environment O and the opening II leads to the space P in this example. The direction and depth of deformation of the chamber K is represented by a gray flat, thin broken arrow in a gray field.

Figure 14B:
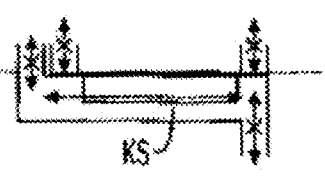

The FIG. 14B shows that reinflation does not start in a chamber created in this way because its lengthwise part KS connected with the openings I and II is permanently through-going and the deformation in it does not cause the necessary compression and transfer towards the tire. No reinflation or no pumping is represented here by crossed broken arrows at the openings I and II. In order to function properly it is necessary that a valve is placed at one of these openings or in between them, which can prevent leaking of air from the tire through the part of the chamber KS.

Figure 14C:
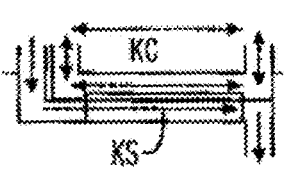

In FIG. 14C, air from the external environment O is let in or pumped to the part of the chamber KC which can contract the section of the part KS and its depth. The chamber deformation can then close the rest of the section of the part KS of the chamber crosswise and transfer the air from the external environment O into the internal space of the tire. Thus the air from the tire can be let in the part KC only under the ambient pressure or lower, first it reinflates the air through the opening III into the part of the chamber KC thus "inflating" this part up to the volume needed that is sufficient for the crosswise contraction of the section of the part of chamber KS. In this case it is also necessary that a valve is placed also at the opening IV, which can keep the part of the chamber KC inflated; alternatively, some of the valves can be replaced by the deformation. Again, the part KS can press on the part KC through a lever.

Figure 15A:
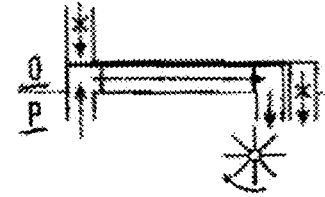

The FIG. 15A shows a power generator placed at the output from the chamber. The generator in this case consists of or comprises a blade wheel, however, it can be any other type of a generator propelled by air jet or air pressure, e.g. a rotating ball, propeller, piezo-electric generator, etc. The generator can be placed at the chamber inlet or outlet, it can be a divided as well as undivided chamber designed for tire inflation but even a chamber created only for the propulsion of the generator and not inflation. It means that the generator can be placed behind any type of the chamber with shape memory deformed by the tire. The generated electric power can be accumulated in form of electricity and/or it can be used to propel electric equipment in the wheel or tire, e.g. pressure and other sensors, wheel data transmission devices, etc. The device can include an electric accumulator. In certain circumstances, the device can include a data transmission module.

Figure 15B:
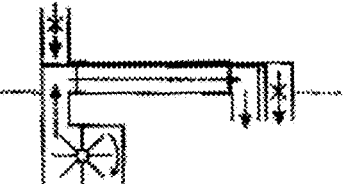
Figure 15C:
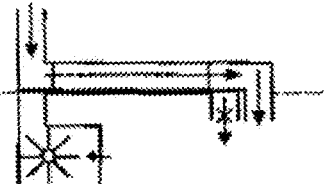

The FIG. 15B shows a generator at the inlet of the part of chamber KC in the moment of air circulation between the tire and part of the chamber KC. The generator also functions as a valve if it is mechanically or electrically stopped, the air at this inlet into KC is throttled or completely ceases to flow and KC is collapsing thus blocking KS. The generator can also function as a valve or a throttle valve. If it is fitted with a free-wheel it can function as a mechanical non-return valve etc. In the example the generator in FIG. 15C has been stopped mechanically by its move in the direction of the thin broken arrow towards the left wall. This is a blade-wheel generator; however, any other known type of a generator can be used, e.g. one based on a propeller, gear-wheel pump, piston-type generator, piezo-electric generator, etc. The generator needs not generate only electric power but also a mechanical work and it can also propel for example another pump etc. It can also function as a sensor (the velocity of the air flowing around it is direct dependent on the speed of the wheel) or it can be affected by the change of pressure and temperature etc. The change of speed or of the power generated is then directly associated to the change of these parameters. The generator can then be used to provide power to any of the other functions of the system.

The solutions described in the above examples are described especially in location by the tire tread, between the tire and rim, or between two tires. However, they can be placed in any place between two points changing their relative distance while one of them can be placed on the tire or next to it.

The electric power generator can consist of or comprise a coil moving in the magnetic field, where one part is connected with the tire and the other with the rim. One or more coils then can be connected with the base OD or rim 7 and the magnetic layer with the tire P or vice versa, while the components are appropriately shaped in order to make linear movements between the coil and the source of magnetic field.

The chamber with shape memory for pressure adjustment in the tire according to this invention can find its application in production of new tires and in modification to existing tires, both for passenger vehicles and utility vehicles, bicycles, or motorcycles.

In a diaphragm pump embodiment, the chamber can have a shape memory for the adjustment of the pressure in tires, that is connected at one end to the delivery point of the medium and at the other end to the source of the medium, whereby there are fibres at a mutual distance of 0.01 to 50 mm across at least part of the wall of the chamber and/or its carrier. Any self-inflation system, including self-inflation systems with a diaphragm pump can be employed. Selection of features can depend on particular factors to be relied on in the system.

In the preferred embodiment, the fibres link the walls of the chamber and/or the chamber wall to the chamber carrier and/or the fibres are attached to the chamber carrier and/or to the tire.

The delivery point and/or the source of the medium used is/are the internal space of the tire and/or the exterior environment of the tire and/or the reservoir and/or the inner tube and/or the interior of the valve and/or of the regulator. The medium can be air, nitrogen, another gas or a gas mixture.

In another preferred embodiment, the fibres interconnect with the opposite walls of the chamber. These fibres may connect a wall on the inner diameter of the chamber to a wall on the outer diameter of the chamber. The fibres can be parallel to each other or may form patterns and/or polygonal patterns and/or they may intersect or be skewed. The fibres may also either be wavy and/or elastic.

In another preferred embodiment, the chamber carrier is a tire and/or its inner tube and/or an ancillary structure. This chamber can be attached to the carrier by means of fibres. The fibres preferably comprise a part of the bridge of the chamber and/or of the tire and/or of the inner tube and/or of the ancillary structure that precludes the collapsing of the chamber with the exception of the effect that the tire's deformation load has on the chamber.

Either below the actual chamber itself and/or as a part of the chamber, there is a belt that prevents the closing of the chamber from below by the active pressure from the inner tube. The belt can preferably also contain fibres.

The chamber may additionally be provided with bridging that is anchored to the sides of the chamber and thereby the chamber is protected against its expansion. It comprises an inner tube made of an elastic material, which in at least a part of it is implemented with a pattern of fibres for arresting any crack propagation. The chamber and/or its carrier is/are, at least in part, covered with a grid for arresting any crack propagation. The solution may include a bridge, a belt and/or a grid that is made of fibres and/or a fibre pattern designed to arrest any crack propagation. The fibres may be textile and/or metal and/or plastic and/or natural fibres and/or synthetic fibres and/or nanofibers. The chamber can preferably be connected by fibres that are wavy and/or elastic to enable the expansion of the chamber and/or of its carrier.

The chamber can preferably, at least partially, be located in an area that is separated from the tire material by a layer of a different material and/or that is kept separated in an individual removable unit. A layer of another material may comprise fibres, fabric and/or of film and/or another form of separator. This solution is designed for the wheels of vehicles and/or of other machines and/or equipment, including equipment that is stationary.

In another preferred embodiment, the inner tube is provided with fibres. The fibres may be parallel and/or skewed and/or wavy and/or elastic and/or form a pattern and/or a polygon.

The inner tube can preferably be connected to the chamber and/or to the reinflating device and/or to another device in accordance with this invention. The inner tube can preferably be made of a non-elastic and/or an inelastic and/or a plastic material and can be connected to the chamber and/or to the reinflating device and/or another device, in accordance with any of the preceding claims.

The inner tube is also additionally provided with a valve, which, in addition to the interior of the inner tube from the ambient environment, also hermetically seals the space between the inner tube and the cavity formed by the tire and the rim from the ambient environment.

The valve, the rim, the tire and/or another part of the wheel are provided with an outlet that enables the aeration of the space between the inner tube and the tire and the rim.

The inner tube can be connected to the chamber and/or to the reflating device and/or to another device in accordance with any of the preceding claims.

Another solution is the use of a chamber that is located in an area that is mechanically separated from the tire material. The part in which the chamber is located is separated from the tire material by partitioning to arrest any crack propagation. Part of the chamber may be located in a separate section, either physically separated from the tire material or inside the tire wall, next to the bead. It may also be located in the ancillary structure, inserted between the tire wall and at least one item of the set constituting the rim, a hubcap, or the support attached to the rim or to the hubcap. The ancillary structure where the chamber is located is preferably attached either to the rim or to the hubcap or to the tire wall. The shape of the ancillary structure where the chamber is located can be adapted on one side for a tighter connection to the tire wall, while on the other side it is dimensionally adapted in order to connect tightly to the rim.

In another embodiment, the chamber is provided with at least one regulator and at least one valve, whereas chamber K has two ends and these two ends are closable by at least one regulator and the valve is positioned between them.

The chamber can preferably have at least two closable inlets to the medium delivery point at opposite ends and between these at least one inlet to the source of the medium or, the chamber can have at least two closable inlets to the source of the medium at opposite ends, and between these at least one inlet to the medium delivery point.

The inlet to the medium delivery point is preferably provided with at least one valve, while the inlet to the source of the medium comprises at least one valve.

The valve preferably comprises at least one of the elements and/or contains at least one of the elements selected from the group comprising: a one-way valve, a two-way valve, a multi-way valve, the closure element, an electronically controlled element, an electronically controlled valve, a gate valve, an element with reference pressure, a spring, a diaphragm.

The regulator may comprise at least the elements and/or contains at least one of the elements selected from the group comprising: a one-way valve, a two-way valve, a multi-way valve, the closure element, an electronically controlled element, an electronically controlled valve, a gate valve, an element with reference pressure, a spring, a diaphragm. At least one regulator, equipped with at least one valve, is provided with the elements needed for bidirectional operation.

The chamber and/or the device and/or the inner tube is/are preferably located in the area of the tire wall, next to its bead.

The chamber may be located in the ancillary structure, inserted between the tire wall and at least one item of the set constituting the rim, the hubcap, or the support that is attached to the rim or to the hubcap or to the inner tube. At the inlet and/or the outlet of the pump, there is a section with a minimum specified volume.

The pump can preferably be provided with a three-way valve, comprising the inlets of the source for the pump and of the delivery point of the pump, whereby one inlet is provided with a valve, the next inlet is directly connected to the pump and the final inlet is interconnected with the closure element. The interior wall of the pump may be fitted with a ring, whereby the distance of its outer side from the rotation axis of the tire is equal to 1 to 1.1 times the distance of the lower part of the pump from the rotation axis of the tire.

The pump can preferably be in the shape of a curved hollow channel, at least one peripheral wall which is at least partially formed by at least one section of the pair of surfaces that lie in the longitudinal direction of the pump and that are positioned mutually at an angle of $\alpha=0$ to $120°$, whereas if the angle were $\alpha>0°$, it would be placed at the connecting edges of these surfaces, located on the far side of the central cross sectional area of the pump. Alternatively, the pump can have other cross-section designs.

The length of the chamber can preferably be greater than the length of the tire circumference that has not been deformed by contact with the ground. The length of the chamber in its preferred embodiment is less than the length of the tire circumference that has not been deformed by contact with the ground.

The ends of the chamber may be adjacent to each other or they may be closer than 10% of the length of the tire circumference to each other.

This invention also involves a tire and/or an inner tube and/or a rim and/or an ancillary structure adjacent to the tire and/or a wheel and/or a chamber and/or reinflating equipment that is/are fitted with at least one of the devices that is identified above.

An Explanation of the Drawings in the Figures

Figure 2:
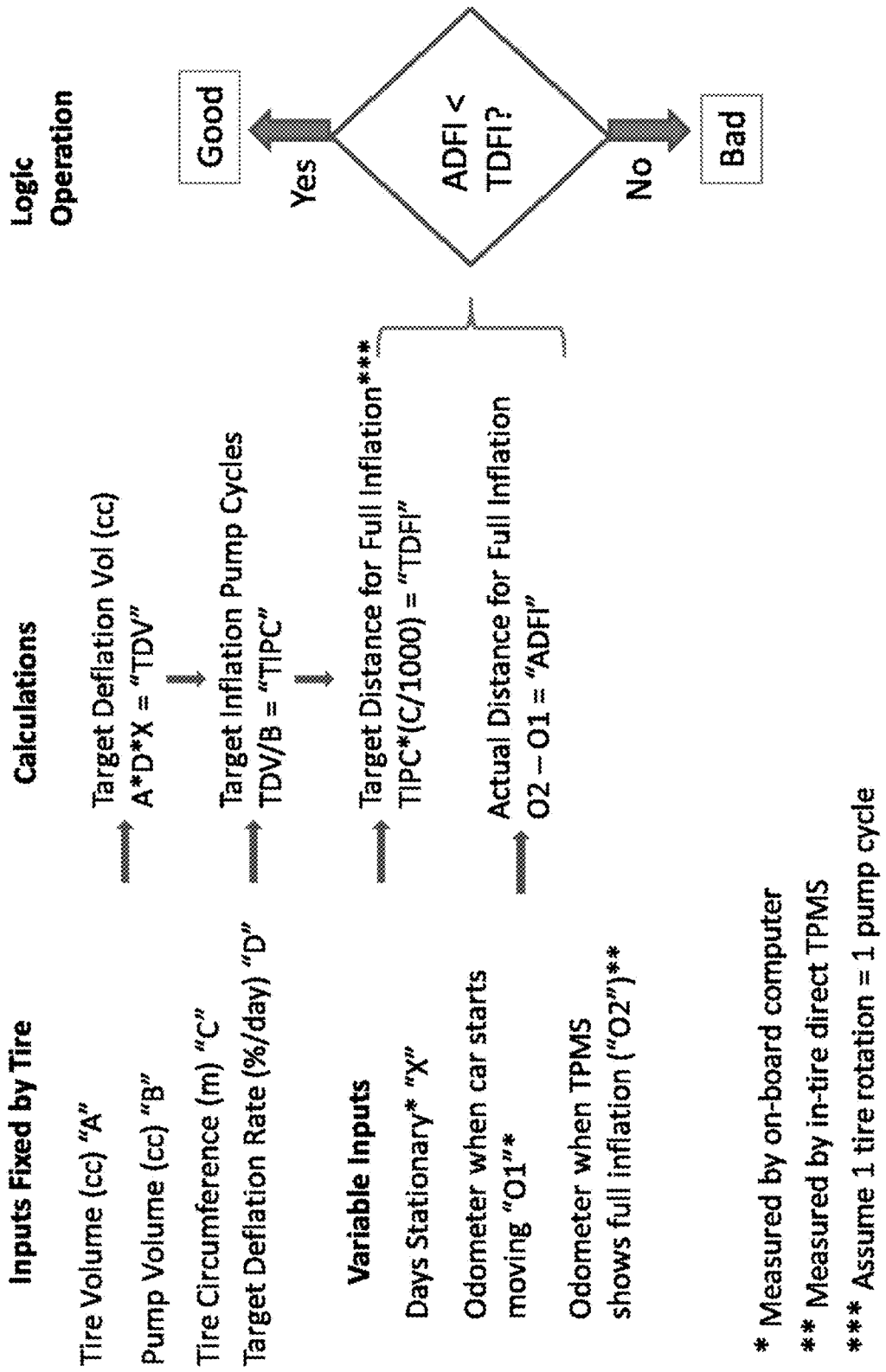
FIG. 2 shows a schematic of a second alternative of a monitoring system.
Figure 3:
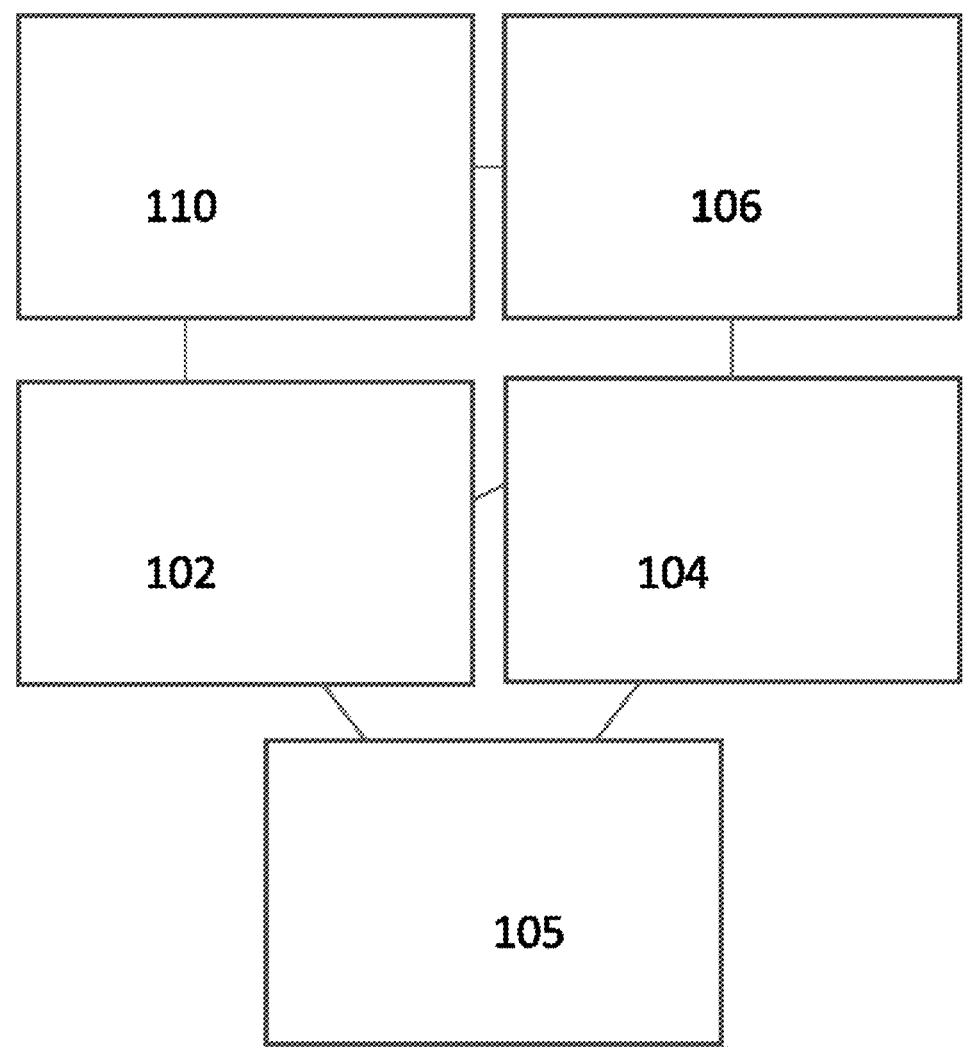
FIG. 3 shows a schematic of a device.
Figure 4A:
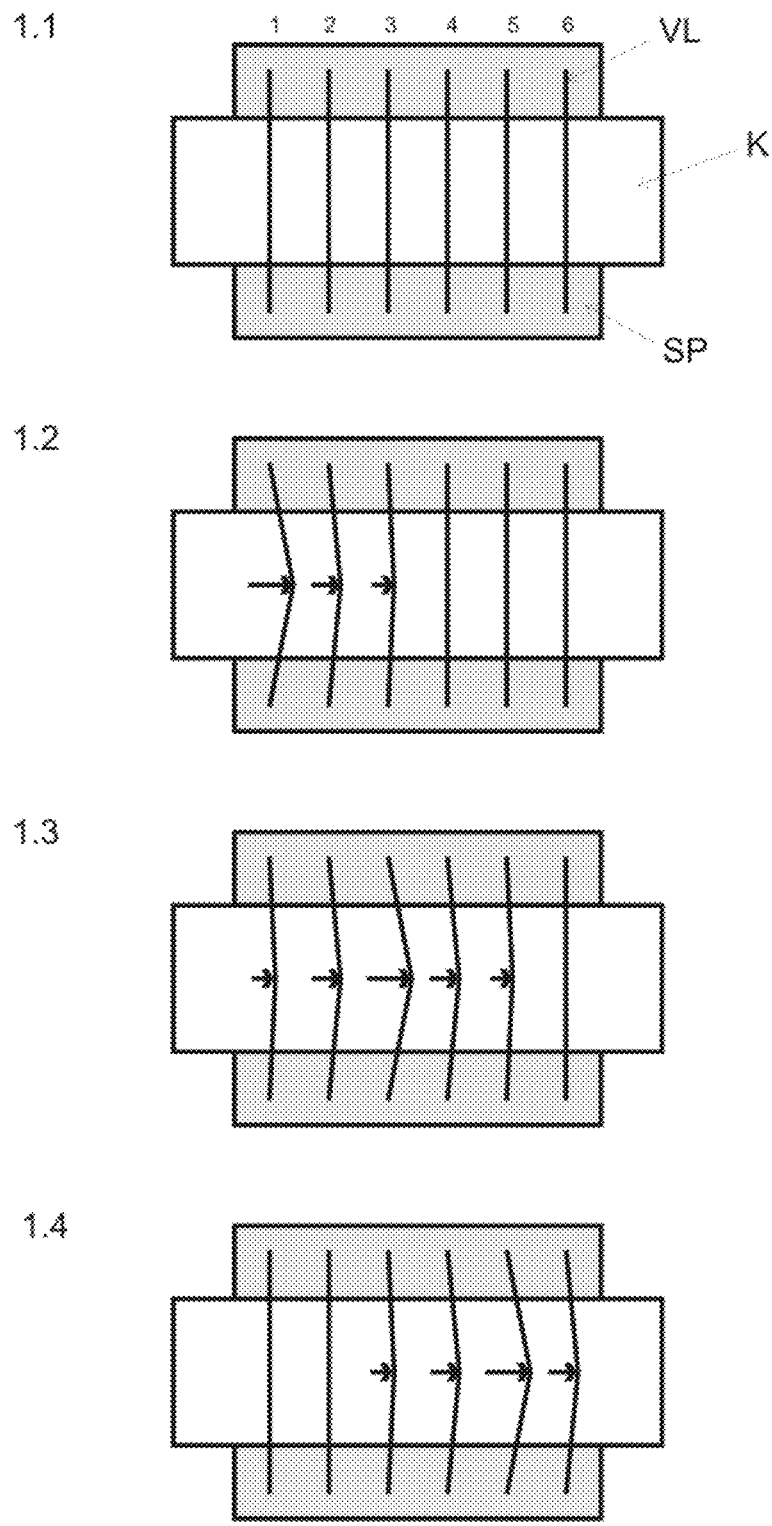
Figure 4C:
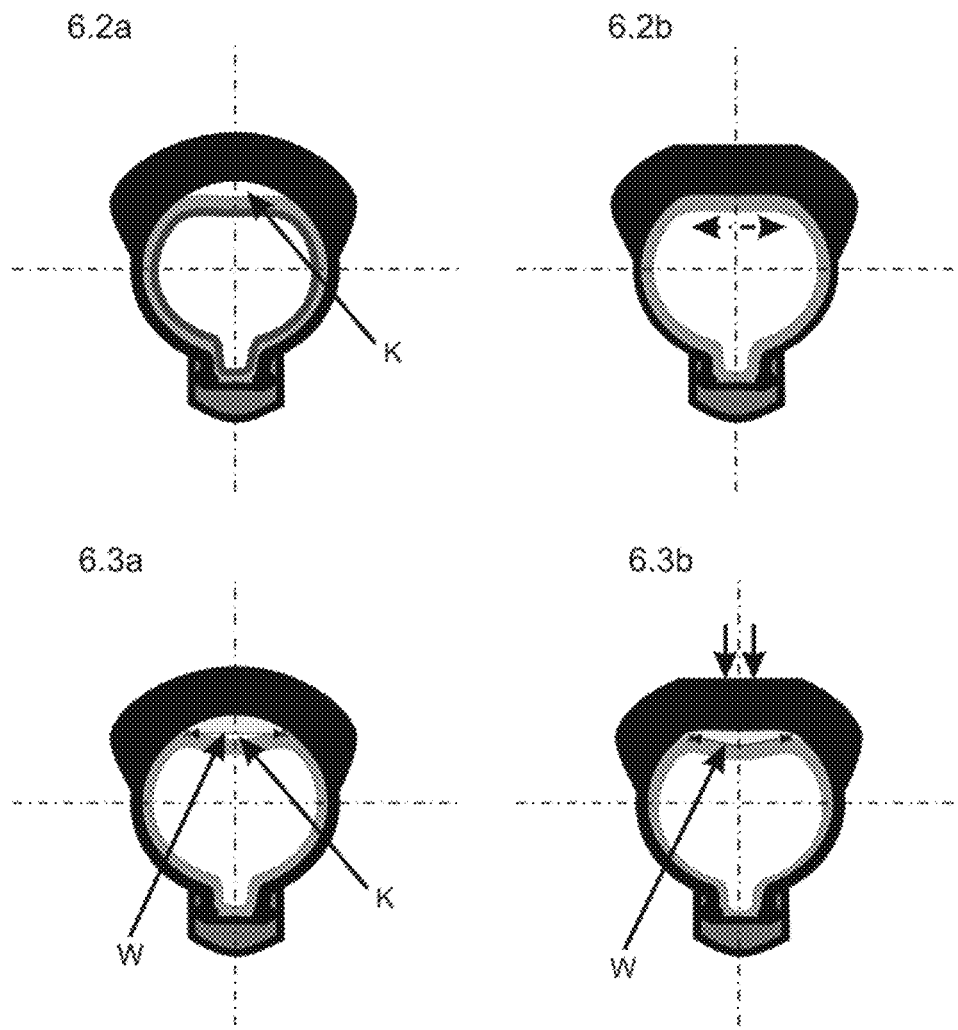
Figure 4E:
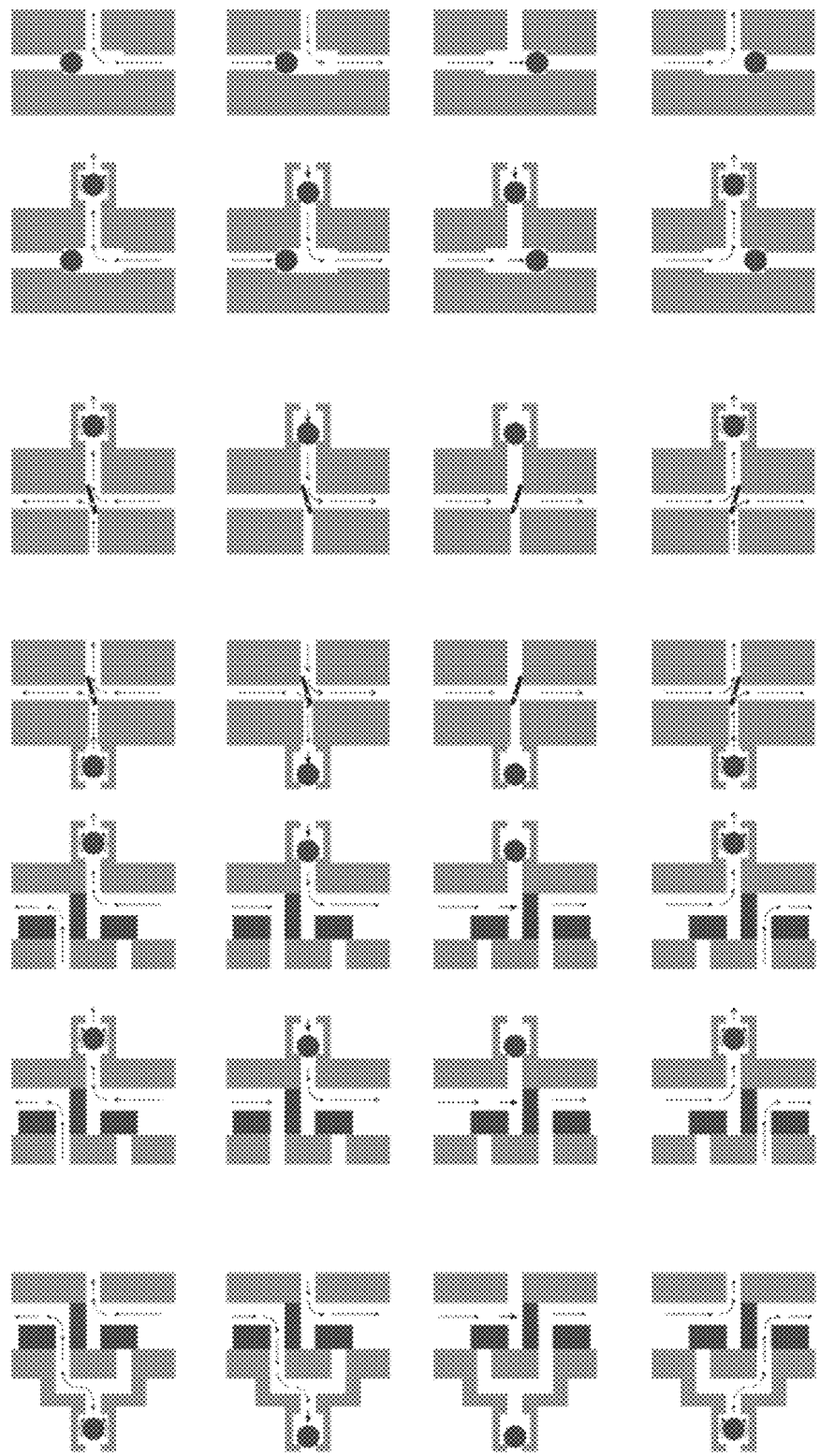
Figure 4G:
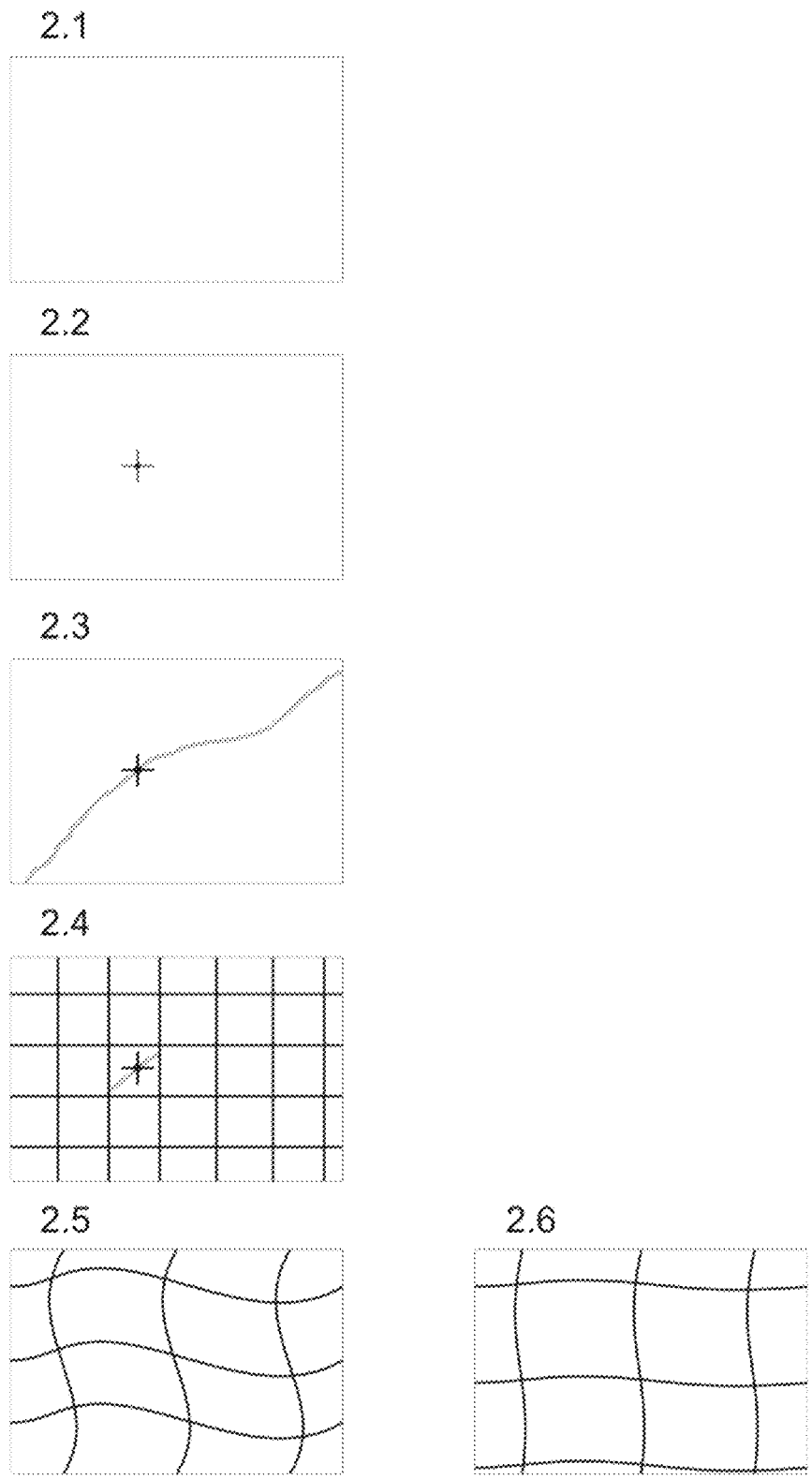
Figure 4H:
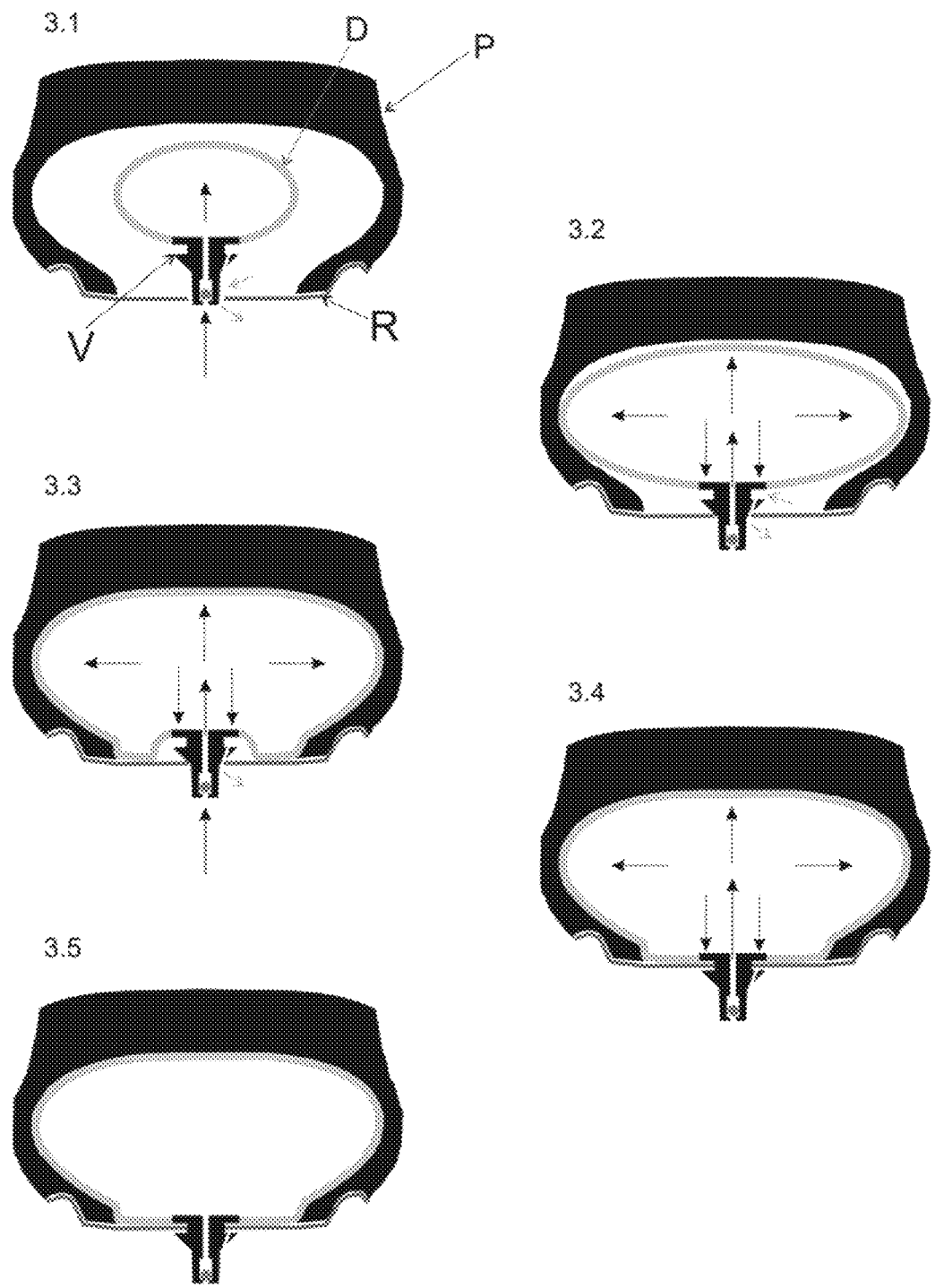
Figure 4J:
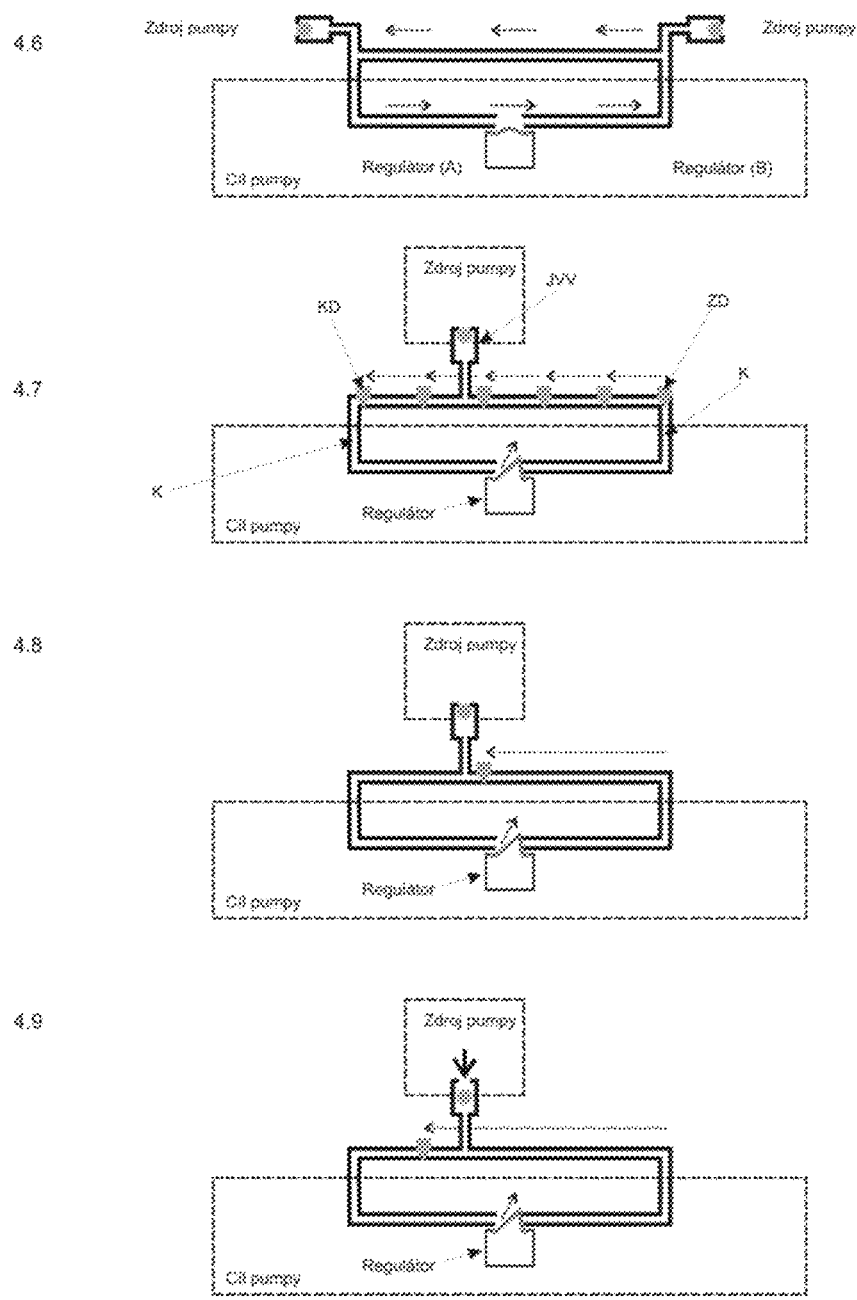

In accordance with this invention chamber with shape memory for adjusting the pressure in the tires its specific embodiments can be described in greater detail, in the attached drawings. In FIG. 4A, panel 1.1 the chamber is placed on a surface. FIG. 4A, panels 1.2, 1.3 and 1.4 depict the deformation of the tire. FIG. 4G, panel 2.1 shows the selected rectangle of the inner tube surface at the point where the damage occurs. FIG. 2.2 depicts a puncture. Crack propagation is shown in FIG. 4G, panel 2.3. FIG. 4G, panel 2.4 introduces the adjustment that was applied to the tire. FIG. 4G, panels 2.5 and 2.6 show fibres. FIG. 4H, panel 3.1 depicts the tire together with the inner tube and the valve. In FIG. 4H, panel 3.2 the inner tube has expanded, whereas in FIG. 4H, panel 3.3, it already occupies the entire volume of the tire. FIG. 4H 3.4 depicts the valve being inserted to its final position. FIG. 4H, panel 3.5 shows the final status. Re-inflating from the source is illustrated in FIGS. 4I-4J, panels 4.1 to 4.6. FIG. 4J, panels 4.7 to 4.9 depict the integrated valve, while FIG. 4D, panels 5.0 to 5.5 illustrate the functioning of this valve and FIG. 4E, panels 5.6 depicts its particular embodiments. FIG. 4B, panels 6.0$a$ and 6.0$b$ show a regular car tire with an inner tube, while the design of a tire with a ring inside it is depicted in FIGS. 4B-4C, panels 6.1$a$ to 6.3$b$, while the separate part is shown in FIG. 4F, panels 7$a$ and 7$b$.

Examples of Implementing the Technical Solution

Examples of the diaphragm pump are described using individual examples.

Example 1

Chamber K with shape memory for adjusting the pressure in tire P, which comprises a part of tire P or that is adjacent to the wall of tire P and is connected at one end to the interior of tire P and at the other end to the external environment O, is in the shape of a curved hollow channel.

If peristaltic chamber K with shape memory is attached to tire P and it is compressed towards the axis of tire P, chamber K closes based on a mutual contact between the upper and the lower walls of chamber K. The upper and the lower walls are located on different radii and they therefore have different circumference lengths. For example, if chamber K has a height of 1 mm and it surrounds the entire circumference of tire P, the difference between the lengths of the upper and the lower walls can be $2 \times pi \times 1$ mm, i.e. 6.28 mm. At each revolution, therefore, shearing between the upper and lower walls in the range of 6.28 mm can occur. This shearing can create friction, thereby destroying the walls of chamber K and also generating heat.

The deficiencies mentioned above are largely eliminated by chamber K with shape memory for pressure adjustment in tire P, that constitutes a part of the tire or is adjacent to the tire wall and, in accordance with the present invention, is connected at one end to the interior of the tire or to the chamber K delivery point and at the other end to external environment O or to the source for the chamber. If anchoring fibres are to be guided across chamber K, with a span of 0.5 mm, for example, then the shear can only accumulate between these fibres and can not be transferred behind them. There the shear is distributed evenly along the entire length of chamber K. Also diminished is the maximum possible size of the shear. The fibre can be anchored to the opposite wall of chamber K or to a component that is connected to it. It may, for instance, be looped around chamber K to anchor together the lower and the upper walls of the chamber, or designed to intersect one wall of the chamber and to become anchored to the surrounding material. The fibres can only be connected to the components described in a portion of their length and/or of their number and then in the other portion of their length be connected to other elements that are not described here.

Example 2

In FIG. 4A, panel 1.1 chamber K is placed on surface SP, which may, for example, be the inner tube of tire P or one of the actual layers of tire P or even an entirely other part that is located on the wheel. The chamber may then be covered with an additional layer, so that, for example if layer SP is actually meant to be the layer of tire P and chamber K is on it together with another layer of the tire, the external appearance of tire P does not need to be different than that of a regular tire. Chamber K, which can be viewed on the images from above, has the shape of a hollow tube, i.e. we do not see inside it.

In FIG. 4A, panel 1.1, the fibres that are guided across chamber K are connected both to it and to layer SP. In FIG. 4A, panel 1.2, the location of chamber K is affected by deformation of the tire, which arrives into chamber K from the left and deforms and rolls ahead the chamber wall, resulting in a dilatation of fibres VL in direction from left to right. In FIG. 4A, panels 1.3 and 1.4 the deformation has already progressed further and the fibres on the left side are re-adjusting. The deformation does not accumulate beyond the extent that the fibres permit. Otherwise it could happen, for example, that the deformation could accumulate for the entire period of a revolution and would be released only once per revolution in the form of shearing of the upper wall of chamber K against the opposite, lower, wall of chamber K at a single point. This would weaken this place, which would then also become a natural candidate for shearing during the subsequent revolution, and with each revolution, this trend would increase and this place would rapidly be destroyed. Fibres SP, however, distribute this potential destruction across a greater part or the entire length of chamber K. This example describes a solution implemented by using a peristaltic pump; similarly, however, it is also applicable to other pumps, where the opposite walls of the pump come into a contact with each other, e.g. a diaphragm pump.

Example 3

By default, the inner tube of the tire is produced from an elastic material. FIG. 4G, panel 2.1 shows the selected rectangle of the inner tube surface at the point where damage does occur, for example by puncturing. In FIG. 4G, panel 2.2 the puncture in the inner tube is marked by a cross, together with a dot. Since the inner tube is made of an elastic material and the pressure inside it is high, punctures spread in the form of a crack that almost immediately causes a rupture and a loss of pressure in the inner tube. This is shown in FIG. 4G, panel 2.3 as a freehand grey line; the crack propagates across the rectangle, and perhaps even behind it, through the surface of the inner tube. This can be prevented, however, if an adjustment of the inner tube is implemented as is shown in FIG. 4G, panel 2.4. In FIG. 4G, panel 2.4, the inner tube is fitted with a fabric or another grid that can prevent the crack from spreading. Thereby the length of the crack can reach only as far as to the nearest fibre of the grid. This is an advantageous solution, especially in combination with reinflating tires, which can gradually reinflate, compensating for the air escaping from the inner tube and if the actual inner tube also represents a carrier for a peristaltic or another type of pump, the inflated inner tube can support this pump in its working position. A similar effect can be achieved by replacing or covering the inner-tube material with a non-elastic material or a material that is resistant to crack propagation. Either the entire inner tube or only its exposed parts, e.g. the tread, can be covered. The fibres do not need to have a square pattern, as shown in FIG. 4G, panel 2.2 but, for example, they can also have triangular or other kinds of patterns. The fibres can also be arranged diagonally, which can ensure that the inner tube can be stretched during the filling of the tire, while if because the fibres are moving away from each other, they can still capture and define the maximum length of the crack. The fibres may also be wavy, as can be seen in FIG. 4G, panel 2.5, and thereby enable the stretching of the inner tube as is shown in FIG. 4G, panel 2.6, whereby the fibres re-adjust a little and the space between them increases, but the fibres can still define the maximum crack length (between them). The fibres may also be produced from a combination of textile and rubber materials as it is used, for example, for elastic bands that are used in clothes, which are elastic but also have a defined maximum length at which the stretching is terminated at this pre-defined length. These rubber-bands, for example, are spirally braided with a yarn and have a predetermined length.

The inner tube may also be made from inelastic or plastic materials, which ensures their essential impermeability, such as for impermeable textiles, foils, carbon and other similar types of products. This prevents any rapid deflation, or for example, in the case of using carbon, it increases its puncture resistance. An inner tube of this kind may then advantageously constitute a pump for re-inflating tires.

Example 4

By default, the inner tube D of tubed tire P is separated from its external environment O by a valve, whereas the space between tire P and inner tube D is not hermetically separated from its surroundings. If the inner tube D is punctured, air from the inner tube D immediately escapes into tire P and subsequently around valve V out of the tire-rim assembly. This instant deflation is highly dangerous and represents one of the major disadvantages of tubed tires. It is possible to create tire P, which although it has an inner tube D that normally secures the hermeticality itself, the actual tire P itself is additionally hermetically separated from its external environment O. This makes sense, especially with regard to the self-inflatable tire P, in which the inner tube D acts primarily as the carrier of a reinflatable device; in the case that any defect appears, however, this combination can have the same degree of resistance against rapid deflation as tubeless tire P.

This is achieved in the following manner. Inner tube D is fitted with valve V, which, in addition to sealing the interior of inner tube D, also hermetically separates the space between inner tube D and the cavity formed by tire P and the rim from their surroundings. In this manner, valve V has a similar sealing function as the usual valve of a contemporary tubeless tire.

Since valve V would prevent the necessary degree of inflation of inner tube D and would thereby prevent the possibility of forcing the air out of tire P, so that inner tube D could assume its proper position and fill the entire volume of tire P, the valve or the wheel assembly must be provided with an outlet that enables venting the spaces between inner tube D and tire P and the rim. After this venting, the outlet is closed and thereby prevents any further leakage of air from tire P. Closing the outlet in this manner does not hermetically seal the interior of tire P from its external environment O until the commencement of venting the air from the space between tire P and inner tube D.

The valve, in accordance with the present invention, may have a similar shape to that of the current tubeless valve that has the shape of a plug, which has to be forcibly drawn into its position in the rim. If, prior to the final fitting-in-place of the valve V body, there should be a leak in the side of valve V, for example, or another gap appears between the rim and the body of valve V through which air can escape, while inflating inner tube D, tire P can also be vented through this gap. After inflating inner tube D to the same full volume as tire P and forcing air from between inner tube D and tire P, inner tube D, by its own pressure, can insert valve V to its final position in the rim and thereby seal the entire system. The valve can also be fitted into its final position either manually or else mechanically, or it can be sealed to the rim by means of a nut with a gasket, in a similar manner as is currently used in the case of tubeless valves. It is also possible to vent the space between the tire and the rim through an additional gap or outlet, which is subsequently sealed. Air can, for example, be forced out between tire P—around its bead—and the rim, until the moment at which the pressure of inner tube D on tire P and its bead is sufficient to enable the bead to snap into its proper position in which it is sealed against the rim. The bead may also be fitted into the side of the rim, for example, with a gap or a channel that enables the air to escape and after the bead snaps into its final position this gap can disappear so that it actually no longer connects the cavity between tire P and inner tube D to its surroundings.

FIG. 4H, panel 3.1 depicts tire P with inner tube D and valve V. Whereas inner tube D is inflated through valve V, as is shown by the continuous arrows, the air from the wheel space around inner tube D (marked in grey) is forced out around valve V and into the atmosphere, as is indicated by the dotted arrows. FIG. 4H, panel 3.2 illustrates the expansion of inner tube D, as is indicated by the dashed arrows, and while valve V abuts the rim; its wall, however, is provided with a channel that continuously vents air from the space between inner tube D and tire P and rim R, as indicated by the dotted arrows. In FIG. 4H, panel 3.3, inner tube D already occupies almost the entire volume of tire P, with the exception of a small area located around the actual valve V; the pressure of inner tube D increases and pushes onto valve V until it is inserted into its final position (depicted in FIG. 4H, panel 3.4), at which point there is only a minimal amount of or no residual air between tire P and inner tube D. After tire P has been reinflated to its operational pressure, the system stabilises in the status shown in FIG. 4H, panel 3.5. In the event of any imminent destruction of inner tube D, the air in inner tube D escapes only into the area that is enclosed by tire P, rim R and the valve of inner tube D. This solution is advantageous if the inner tube is supplied for the tire or for the tubeless tire to specifically be the carrier of a pump device, a peristaltic pump for example, or a source of compressed air to be utilised for driving the mechanical equipment. This example describes the solution whereby the air that is forced out from the inner tube escapes around the valve, though it may, similarly and advantageously, escape from the wheel assembly through another point, if the assembly, after dispensing the requisite volume of air, has been re-sealed.

Example 5

The applicant additionally describes in the present invention a new solution that enables inflation in both of the directions of rotation of the tire, while ensuring relief of the chamber by means of internal or external circulation whereby, with the exception of during inflating, air is transported only through the enclosed chamber or it is returned to the place from which it was taken. For example to the tire, the reservoir or to the external environment of the tire. A solution like this is shown in FIGS. 4I-4J, panels 4.1 to 4.6, in which FIG. 4I, panel 4.1 depicts reinflating from the source, e.g. from the external environment of the tire, via a peristaltic pump and a right-hand regulator that has diaphragm B, formed in this case by a referential space with a diaphragm, but it can also be of a different type, electronic or mechanical, or utilising a vane, a blade, a spring etc.; in principle any method that arrests or slows down the flow of air through the specific inlet to the delivery point of the pump which, in this case, is a tire. If the tire—the delivery point of the pump—is underinflated, the diaphragm of regulator A closes the inlet and a vacuum is formed in the pump, which opens the left-hand inlet valve LVV and initiates the sucking of air into the chamber and then pushes it around diaphragm B to the delivery point of the pump—to the tire—as identified by the dashed arrows. Both diaphragm A and diaphragm B attempt to eject because they both respond to the underpressure in the tire; diaphragm B, however, is moved by the air that flows from the chamber. If the regulator comprises an element that is not moved by the flowing air, it is possible to incorporate a separate one-way valve next to it, one that can release this air from the pump to the tire. A unidirectional valve of this kind can be installed for each of the regulators or for each inlet from the chamber to the tire. FIG. 4I, panel 4.2 depicts the scenario in the case of a properly inflated tire. The regulators' diaphragms are retracted and the air circulates in the direction indicated by the dashed arrows. FIG. 4I, panels 4.3 and 4.4 show the same situation, but the wheel is rotating in the opposite direction and thereby the direction of the air-flow has also reversed, which results in the opposite engagement of the individual elements in comparison with FIG. 4I, panels 4.1 and 4.2. FIGS. 4I-4J, panels 4.5 and 4.6 illustrate their unification into a single regulator, in this instance with a single diaphragm; a regulator with two or more diaphragms can also fulfil a similar function, however. The tire shown in FIG. 4I, panel 4.5 is underinflated and the diaphragm has been ejected and this closes the left-hand inlet to the chamber. At the same time the diaphragm has been pushed aside by the air flowing out of the left-hand outlet from the chamber and air is now flowing into the tire. On the right-hand side a vacuum has formed which opens the right-hand inlet valve PVV and starts sucking air from the source for the pump until the tire has been reinflated and the diaphragm has been retracted into the regulator. The regulator illustrated is not necessarily a diaphragm regulator; it may be based on a blade, be electronic, a vane, a spring or another mechanical device. Inlet valves PVV and LVV can be combined as a single inlet valve JVV, which may substitute one of these or be anywhere else in the circuit. Such a situation is depicted in FIG. 4J, panels 4.7 to 4.9.

In FIG. 4J, panel 4.7, valve JVV is located in a place between the original location of valves LVV and PVV. Also indicated is the deformation of chamber K, which is marked with grey tips that interrupt the chamber sequentially at 6 different points. In fact, this represents a single interruption of the chamber that occurs six times consecutively, with the proviso that this interruption progresses between these positions following the directions of the dotted arrows. The starting-point of the deformation is identified as ZD and its end-point is shown as KD. The delivery point of the pump (in this example the tire, although there can also be another reservoir and another delivery point) is deflated and the diaphragm of the regulator closes the right-hand inlet to chamber K.

FIG. 4J, panel 4.8 illustrates a situation in which the deformation has shifted from point ZD to the grey-tip points along the dotted arrow. The gas, in this example the air enclosed in chamber K, originally from between the diaphragm of the regulator and point ZD, has now expanded to the grey-tip point while its pressure reduced and a vacuum was created there with a pressure lower than that of the source for the pump. In this example the pressure of the external environment is O, which represents 1 atmosphere. At the same time, the air that was originally present in the area between point ZD and the current location of the tip was fed in the direction of the dotted arrow to the left part of chamber K and additionally around regulator R to the tire.

In FIG. 4J, panel 4.9 the tip of the deformation has already shifted through the chamber behind the connecting point of valve JVV, whereupon it came into contact with the vacuum created in this part of the chamber; the JVV is opening and the pressure in this part is evened up with the pressure at the source for the pump.

In FIG. 4I the deformation shifts to point KD, while in the chamber to the left of it the air is additionally compressed and is then fed to the tire, while in the chamber to the right of the deformation the sucking of air through the JVV continues to take place. If the deformation then leaves the chamber, as indicated in FIG. 4I, in which the tip does not interrupt chamber K, valve JV closes and the tire pressure fills the entire chamber, as indicated by the dotted arrow, around the diaphragm of regulator R to chamber K. The volume of air in the tire and in the chamber has increased in accordance with the volume sucked-in from the surroundings, as indicated in FIG. 4J, panel 4.9.

Another possibility is that before the deformation leaves the chamber at point KD, this deformation again affects chamber K in another area, for example in point ZD, as shown in FIG. 4D. Until this moment, the sucking of air via the JVV and its feeding into the tire has taken place as indicated by the dotted arrow by the regulator. From the termination-point of the deformation at the point KD valve the JVV is closed and the pressure evens-up towards the deformation illustrated by the grey tips. The evening-up of the pressure from the tire to the chamber is indicated by a dotted arrow on the regulator R. Simultaneously, on the other side of the deformation and towards the end of the chamber closed by the diaphragm of regulator R, the original vacuum still remains and thereby this area does not need to be vented again and this pump can have a greater degree of efficacy than the pump.

In FIG. 4D, panel 5.5 the deformation has already shifted and the new cycle continues and so does the compression of air in the tire.

Valve JVV may also be placed differently than described in these examples; for instance, it does not need to be connected directly to the chamber that passes through the area of deformation, but it can also be closer to the regulator or to a part of one or both of the regulators. Depending on the conditions, an embodiment can be selected with the advantage that when it is placed next to one of the outlets of the chamber, in or opposite to the direction of deformation; reinflating can still function, however, regardless of the direction of rotation of the tire.

The valve is described as being unidirectional, however it can be of any type that provides the necessary features, e.g. a two-way valve, a controlled valve, a multi-way valve, the closure element, the electronically-controlled element, an electronically-controlled valve, a gate valve, an element with referential pressure, a spring, a diaphragm.

Similarly, the regulator may also comprise any similar device.

In order to ensure the bi-directional operation of the pump, it is also possible to use a simple valve together with a ball, a flap or a slide, which is moved by pumped air that closes unwanted directions and opens the desired air-flow directions. A valve of this type is shown in FIG. 4D, panel 5.6. The forces that are generated, for example, by means of a peristaltic pump are sufficient even in a rotating tire, to shift the element and to maintain it in the required position. The arrows in the figures show how the pumped air works with a specific element and also how the air is thereby redirected in the requisite direction and how pumping is ensured or the input to or output from a peristaltic pump, either, for example, a classic one-way pump or one with internal or external circulation, etc., but also to/from other pumps.

Example 6

Another solution is to use a pressure-release valve. Any pump and peristaltic chamber can also be used to release air from tires; in this case the air can be pumped out of the tire in the direction of the pressure-release valve. The pressure-release valve can be set so that, for example, it switches off at a pressure of 10 atm., thereby releasing the air. If, for example, the optimum tire pressure is 3 atm. and this is exceeded to 3.1 atm., the pump can start pumping air in the direction of the pressure-release valve. At the moment when the pressure in the pump exceeds 10 atm. next to the pressure-release valve, the valve can open and the pump can drain the excess air away through it. A pressure-release valve set at 10 atm. is both simple to operate and also very safe. It is not the actual tire pressure that opens it; it opens only based on the positive pressure provided by the pump. The pump can be controlled by a regulator, a diaphragm or by other means; it may be unidirectional or bidirectional and have internal or external circulation or any other peristaltic or other type of pump.

Example 7

The invention is additionally related to the bridging of the inner tube. FIG. 4B, panels 6.0a and 6.0b below illustrate the usual tubed car tires. If there is a chamber K created underneath the tread, the tread can lose part of its camber and may begin to collapse. This is illustrated in FIG. 4B, panel 6.0b, in which tire pressure is acting internally on all its walls, with the exception of the tread where the chamber K is located. The pressure on the tire walls sets these sides apart, while, on the other, it pulls the tread down, thereby inadvertently closing chamber K. This can be prevented by the solution described below.

In FIG. 4B, panel 6.1b, in this example of a bicycle, a chamber K is created on inner tube D. Thereby, however, the original tire tread would lose the support of inner tube D and would therefore collapse, as shown in FIG. 4B, panel 6.1b. This collapse would be caused by the pressure of the inner tube on the walls of tire P, whereby the tread is pulled down and at the same time flattens and expands in width. This kind of collapse can be avoided by bridging chamber K, which is anchored to the sides of the chamber and thereby protecting the chamber against becoming dilated. The bridge may have the shape of the arch that in this case also retains the arched shape of the tread. However, the chamber, in accordance with the tread, can have any shape. Beneath the actual chamber a belt is then created, that by the pressure of the actual inner tube D prevents closing chamber K from below. The belt ensures that the inner tube in the place of chamber K does not exceed the diameter equal to, or smaller, than the lower diameter of chamber K. FIG. 4C, panel 6.2a shows bridging W above the chamber anchored at the points that are marked X, with a full arched vault above the bridge that is formed beneath the tread. Chamber K has so far been illustrated excluding the places of deformation caused by the road and the chamber has been open. In FIG. 4C, panel 6.2*b* the chamber is deformed through contact with the road in the direction of the arrows until this deformation causes the desired closing of chamber K by the deformation of the tread and the camber towards the interior of chamber K.

Example 8

The peristaltic chamber in the wall of the tire can be a source of the initiation and propagation of cracks that endanger the operational life of tires. The solution is a chamber K created in a part that is physically separated from the structure of tire P. By means of this separation the crack is then arrested. This can be seen in FIG. 4F, panel 7*a*. Another solution is that of forming a chamber K in a part connected with the tire, though a barrier preventing the propagation of the crack, such as a textile wall, foil or other barrier material inserted between the parts, which can either redirect the crack or halt it. This can be seen in FIG. 4F, panel 7*b*.

The examples describe using vehicle tires; however their advantages can be useful in any machines that use air-filled tires, including such stationary machinery as lifts, conveyor belts on which the belts are stretched on tires, etc.

INDUSTRIAL UTILITY

The chamber with shape memory for the pressure adjustment of tires can find its application in the manufacturing of new tires as well as for the adjustment of existing tires, for both passenger and utility vehicles.

Other embodiments are within the scope of the following claims.

What is claimed is:

1. A riding condition monitoring system comprising:
    a pump unit driven by tire deformation or rotation of a tire of a vehicle; and
    a data collector configured to receive data from the pump unit and, optionally, one or more of a wheel of the vehicle, vehicle, road, driver, operator, a unit outside of vehicle, a pump unit, the tire, a status communication unit and the vehicle; and
    a processing unit configured to determine a condition status any one of the tire, wheel, vehicle, road, pump unit, driver or operator, from the received data; and
    a status communication unit that transmits the condition status to the vehicle, driver, operator, a unit outside of vehicle, a data collector, a pump unit, the wheel or the tire.

2. The system of claim 1 wherein the received data includes information from one or more of the following parameters: tire deformation; tire footprint size or length or area; tire pressure; tire underinflation; tire overinflation; accumulator pressure; altitude; ambient pressure; geographic coordinates; frequency of inflation cycles of the pump unit; frequency of re-circulation cycles of the pump unit; frequency of opening or closing a regulator of the pump unit; length of time of inflation; distance travelled; tire ambient temperature; vehicle ambient temperature; humidity of air inside of the tire; temperature of ambient air; output (power, voltage, etc) generated by an energy harvester of the pump unit; frequency of activation of an energy harvester of the pump unit; tire deflation speed; tire inflation speed; direction of wheel rotation; speed of wheel rotation; speed of vehicle; time of wheel in a stationary status; and characteristics of tire pressure changes over time.

3. A method for determining the condition of a self-inflating tire of a vehicle by monitoring a characteristic of its functions, comprising:
    receiving data from a self inflation device;
    processing the data to determine the condition of the tire based on the data received;
    delivering the condition of the tire to the vehicle based on the processed data; and
    either (i) determining an actual distance travelled for full inflation of the tire based on pump unit cycles or pump capacity or combinations thereof, and comparing a target distance travelled for full inflation of the tires and designating a good tire condition when the actual distance travelled for full inflation is less than the target distance travelled for full inflation, or (ii) determining an actual distance travelled for full inflation of the tire based on input from a tire pressure sensor or pump capacity or combinations thereof, and comparing a target distance travelled for full inflation of the tires and designating a good tire condition when the actual distance travelled for full inflation is less than the target distance travelled for full inflation.

4. The method of claim 3, further comprising determining an actual distance travelled for full inflation of the tire based on pump unit cycles or pump capacity or combinations thereof, and comparing a target distance travelled for full inflation of the tires and designating a good tire condition when the actual distance travelled for full inflation is less than the target distance travelled for full inflation.

5. The method of claim 3, further comprising determining an actual distance travelled for full inflation of the tire based on input from a tire pressure sensor or pump capacity or combinations thereof, and comparing a target distance travelled for full inflation of the tires and designating a good tire condition when the actual distance travelled for full inflation is less than the target distance travelled for full inflation.

6. The method of claim 4 or 5 in which the target distance travelled for full inflation is based on one or more of a target deflation rate for a tire in good condition, the time the tire is stationary, or pump capacity, or combinations thereof.

7. The method of claim 3, further comprising directly measuring the air volume delivered by the self-inflation system to achieve full inflation and comparing the target air volume for full inflation and designating a good tire condition when the actual air volume to achieve full inflation is less than the target volume.

8. A vehicle system condition monitoring system comprising:
    a pump unit driven by tire deformation or rotation of a tire of a vehicle; and a data collector configured to receive data from a data origin including the pump unit;
    a status communication unit that transmits condition data or condition status to a data target; and
    a processing unit configured to determine condition status from the condition data received from the status communication unit.

9. The system of claim 8 where the data origin includes one or more of:
    a status communication unit,
    a pump unit,
    a wheel,
    a valve,
    a tire,
    a vehicle, a computer,
a chip, or
a sensor.

10. The system of claim 8 where data origin includes one or more of a human, a driver, or a operator.

11. The system of claim 8 wherein the pump unit is a peristaltic pump or a diaphragm pump.

12. The system of claim 8 wherein the pump unit contains a bypass valve and the pump is configured to recirculate the gas from an origin into a target.

13. The system of claim 8 wherein an energy harvester powered by tire deformation, tire rotation or movement of pumped air generates electrical energy.

14. The system of claim 8 wherein the system include a battery.

15. The system of claim 14 wherein the battery is charged from energy harvester powered by tire deformation, tire rotation or movement of pumped air generates electrical energy.

16. The system of claim 10 wherein data origin is located on/in vehicle.

17. The system of claim 10 wherein data origin is located on/in wheel and/or tire.

18. The system of claim 11 wherein data origin is located outside vehicle.

* * * * *